US012017784B2

(12) United States Patent
Ferrier et al.

(10) Patent No.: US 12,017,784 B2
(45) Date of Patent: *Jun. 25, 2024

(54) IN-FLIGHT STABILIZATION OF AN AIRCRAFT

(71) Applicant: BETA AIR, LLC, South Burlington, VT (US)

(72) Inventors: Lochie Ferrier, Sydney (AU); Alexander Hoekje List, Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 177 days.

This patent is subject to a terminal disclaimer.

(21) Appl. No.: 17/373,842

(22) Filed: Jul. 13, 2021

(65) Prior Publication Data

US 2021/0339882 A1 Nov. 4, 2021

Related U.S. Application Data

(63) Continuation-in-part of application No. 17/113,647, filed on Dec. 7, 2020, now Pat. No. 11,584,541,
(Continued)

(51) Int. Cl.
*B64D 31/10* (2006.01)
*B64C 15/00* (2006.01)
(Continued)

(52) U.S. Cl.
CPC ............ *B64D 31/10* (2013.01); *B64C 15/00* (2013.01); *B64C 29/0016* (2013.01); *B64D 27/24* (2013.01); *B64D 2045/0085* (2013.01)

(58) Field of Classification Search
CPC B64D 31/10; B64D 27/24; B64D 2045/0085; B64C 15/00; B64C 29/0016
See application file for complete search history.

(56) References Cited

U.S. PATENT DOCUMENTS 8,576,530 B2 11/2013 Aronson
9,376,208 B1* 6/2016 Gentry .................. B64D 35/08
(Continued)

FOREIGN PATENT DOCUMENTS

CN 103963963 B 1/2016
CN 103963963 B 1/2016
(Continued)

OTHER PUBLICATIONS

PCT,US20,63598; International Search Report; Mar. 10, 2021 Authorized Officer: Lee Young.
(Continued)

*Primary Examiner* — Hussein Elchanti
(74) *Attorney, Agent, or Firm* — Lee & Hayes, P.C.

(57) ABSTRACT

A system for in-flight stabilization including a plurality of flight components mechanically coupled to an aircraft, wherein the plurality of flight components includes a first flight component and a second flight component opposing the first flight component. The system further comprises a sensor mechanically coupled to the aircraft, wherein the sensor is configured to detect a failure event of a first flight component. The system comprises a vehicle controller communicatively connected to the sensor and is configured to receive the failure datum of the first flight component from the sensor, generate a failure notification configured to indicate that the vehicle controller received the failure datum from the sensor, and initiate an automatic response as a function of the failure datum. Initiating the automatic response further includes determining an autorotation inducement action for the second flight component to perform and commanding the second flight component to perform the autorotation inducement action.

18 Claims, 14 Drawing Sheets

Related U.S. Application Data which is a continuation-in-part of application No. 16/713,520, filed on Dec. 13, 2019, now Pat. No. 11,592,841.

(60) Provisional application No. 62/912,741, filed on Oct. 9, 2019.

(51) Int. Cl.
  *B64C 29/00* (2006.01)
  *B64D 27/24* (2006.01)
  *B64D 45/00* (2006.01)

(56) References Cited

U.S. PATENT DOCUMENTS

| | | | |
|---|---|---|---|
| 9,397,502 B2 | 7/2016 | Weir | |
| 9,639,087 B1* | 5/2017 | Cutler | G05D 1/0055 |
| 9,828,107 B1* | 11/2017 | Ruymgaart | B64D 31/00 |
| 9,914,535 B2 | 3/2018 | Paulos | |
| 10,005,560 B2 | 6/2018 | Vallart | |
| 10,014,707 B2 | 7/2018 | Rideau | |
| 10,106,268 B2 | 10/2018 | Rossotto | |
| 10,124,893 B1* | 11/2018 | Aalund | G08C 17/02 |
| 10,322,814 B1 | 6/2019 | Tian | |
| 11,459,960 B2* | 10/2022 | Darfeuil | B64D 31/02 |
| 11,584,541 B2* | 2/2023 | List | B64C 39/024 |
| 11,592,841 B2* | 2/2023 | Clark | B64D 45/00 |
| 11,827,346 B1 | 11/2023 | Clark | |
| 2010/0305792 A1 | 12/2010 | Wilk | |
| 2016/0280386 A1 | 9/2016 | Mestler | |
| 2017/0148236 A1* | 5/2017 | Sannino | G06F 16/242 |
| 2017/0313433 A1* | 11/2017 | Ozaki | B64D 17/80 |
| 2018/0237148 A1 | 8/2018 | Hehn | |
| 2018/0290735 A1 | 10/2018 | Uptigrove | |
| 2018/0305005 A1 | 10/2018 | Parks | |
| 2019/0017569 A1* | 1/2019 | Eller | G05D 1/0858 |
| 2019/0033861 A1 | 1/2019 | Groden | |
| 2019/0135411 A1 | 5/2019 | Gonzalez | |
| 2019/0310654 A1 | 10/2019 | Halder | |
| 2020/0079501 A1 | 3/2020 | Graves | |
| 2020/0223547 A1* | 7/2020 | Mehta | G05D 1/0858 |
| 2020/0312163 A1* | 10/2020 | Dürr | F03D 80/00 |
| 2020/0398983 A1* | 12/2020 | Singh | B64C 29/0033 |
| 2021/0139134 A1* | 5/2021 | Atkins | B64C 27/64 |
| 2022/0009626 A1 | 1/2022 | Baharav | |

FOREIGN PATENT DOCUMENTS

| | | |
|---|---|---|
| CN | 107074357 A | 8/2017 |
| CN | 107074357 B | 9/2019 |

OTHER PUBLICATIONS

CSANK, Overview of Intelligent Power Controller Development for the Deep Space Gateway, Presentation, 2017, Cleveland, Ohio, USA.
Jansen, et al, Overview of NASA Electrified Aircraft Propulsion Research for Large Subsonic Transports, Presentation, 2017, Cleveland, Ohio, USA.
Office Action for U.S. Appl. No. 18/139,743, mailed on Jan. 30, 2024, Kyle Clark, "Vertical Take-Off and Landing (VTOL) Aircraft", 29 pages.

* cited by examiner

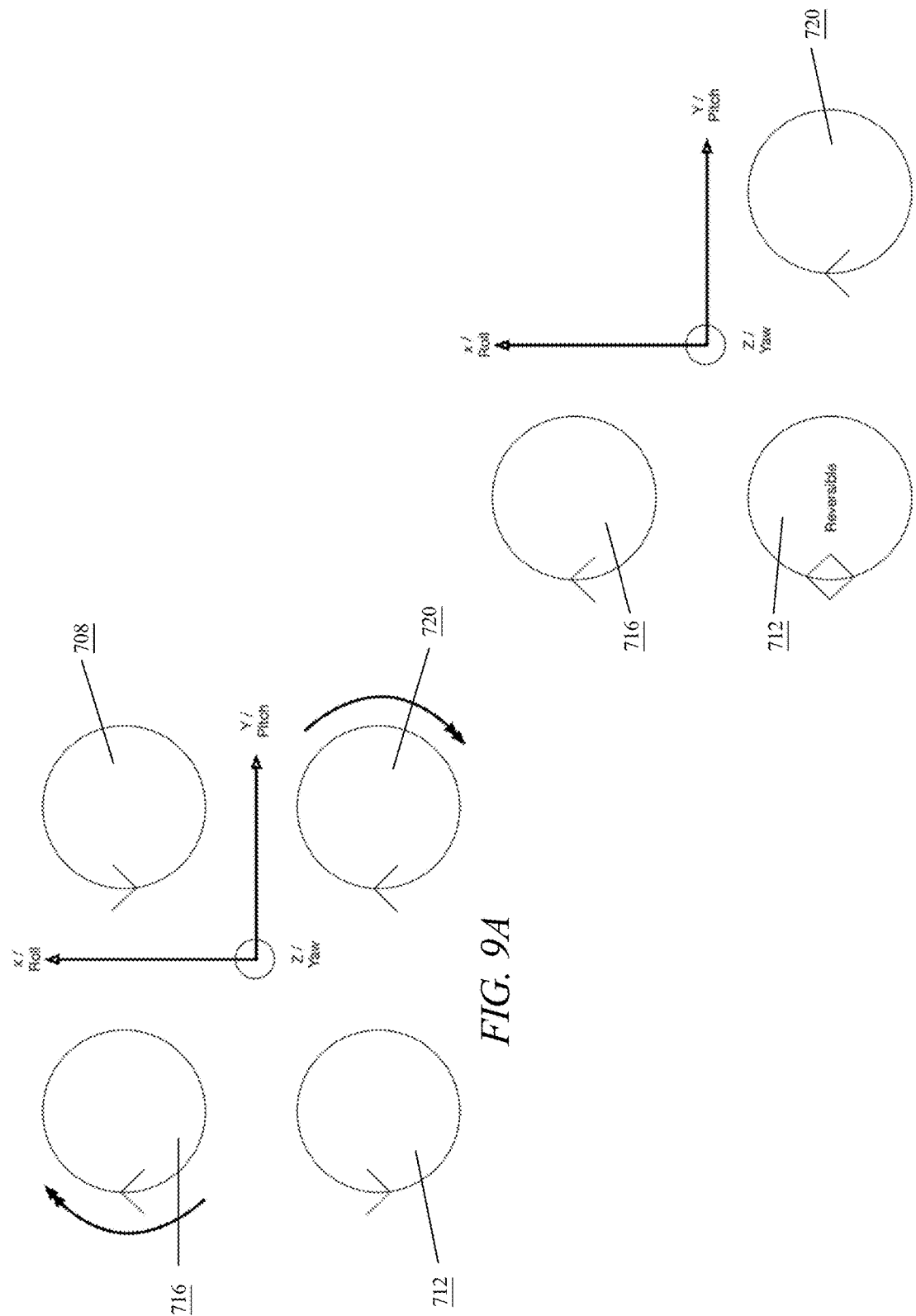

IN-FLIGHT STABILIZATION OF AN AIRCRAFT

CROSS-REFERENCE TO RELATED APPLICATIONS

This application is a continuation in part of U.S. patent application Ser. No. 17/113,647 filed on Dec. 7, 2020 and titled, "IN-FLIGHT STABILIZATION OF AN AIRCRAFT" which is a continuation in part of U.S. Nonprovisional application Ser. No. 16/713,520 filed on Dec. 13, 2019, and entitled "IN-FLIGHT STABILIZATION OF AN AIRCRAFT," which claims the benefit of priority of U.S. Provisional Patent Application Ser. No. 62/912,741, filed on Oct. 9, 2019, and entitled "IN-FLIGHT STABILIZATION OF AN AIRCRAFT," which is incorporated by reference herein in its entirety.

FIELD OF THE INVENTION

The present invention generally relates to the field of electrically propelled vehicles. In particular, the present invention is directed to a system and method for in-flight stabilization of an aircraft.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo.

SUMMARY OF THE DISCLOSURE

In an aspect, a system for in-flight stabilization includes a plurality of flight components mechanically coupled to an aircraft, wherein the plurality of flight components includes a first flight component and a second flight component opposing the first flight component. The system further includes a sensor mechanically coupled to the aircraft, wherein the sensor is configured to detect a failure event of the first flight component; and generate a failure datum associated to the first flight component. Further, the system includes a vehicle controller communicatively connected to the sensor, wherein the vehicle controller is configured to receive, from the sensor, the failure datum associated to the first flight component, generate a failure notification configured to indicate that the vehicle controller received the failure datum from the sensor, and initiate an automatic response as a function of the failure datum, the automatic response including determining an autorotation inducement action for the second flight component to perform and commanding the second flight component to perform the autorotation inducement action.

In an aspect, a method for in-flight stabilization includes detecting, by a sensor, a failure event of a first flight component of a plurality of flight components, generating, by the sensor, a failure datum associated to the first flight component, receiving, by a vehicle controller, the failure datum associated to the first flight component from the sensor, generating, by the vehicle controller, a failure notification, the failure notification configured to indicate that the vehicle controller received the failure datum from the sensor, and initiating, by the vehicle controller, an automatic response as a function of the failure datum. Initiating the automatic response includes determining an autorotation inducement action for the second flight component to perform and commanding the second flight component to perform the autorotation inducement action.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 9A-B is a diagrammatic representation of the instant embodiment;

Figure 1:
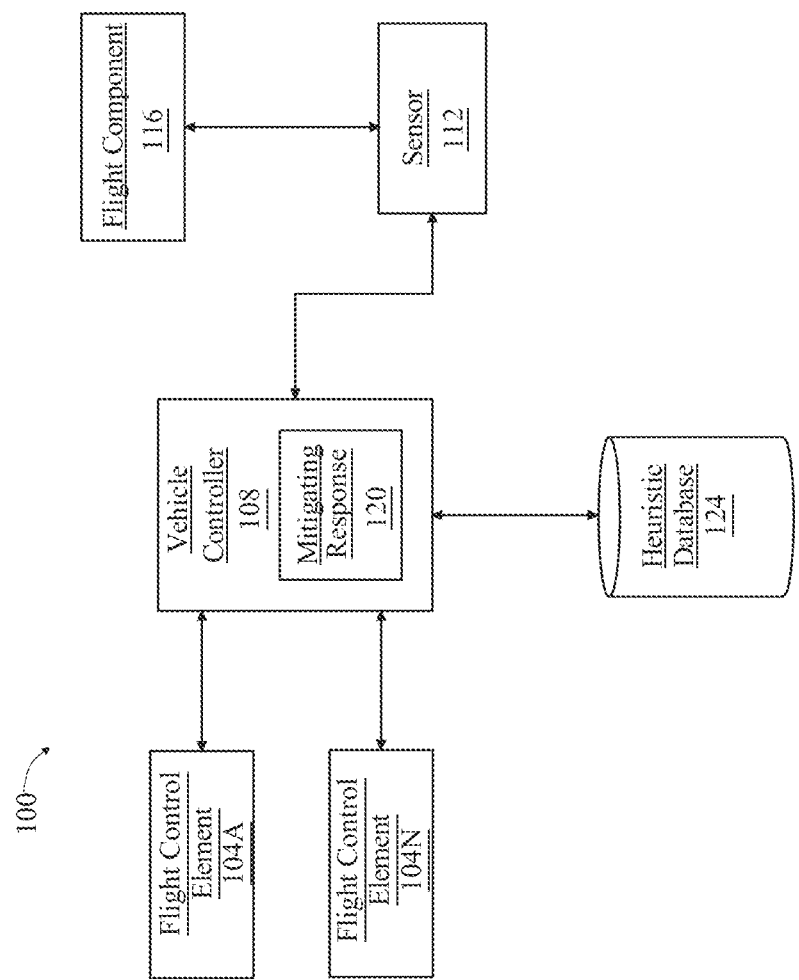
FIG. 1 is a block diagram depicting an exemplary embodiment for an in-flight stabilization system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for identifying a catastrophic event in an electric aircraft and calculating a flight maneuver using mitigation methodology. Aspects of the present disclosure can be used to enable the safe landing of an electric aircraft during situations where there is a failure of a component needed to continue and execute the expected flight plan. Catastrophic failure of an aircraft structure, loss of a prime flight control, or loss of a propulsion unit frequently may result in the loss of control or breakup of an airframe and loss of life. Existing attempts to mitigate failures, or prevent catastrophic outcomes include ballistic parachute systems that fire a physical parachute to carry the entire airframe to the ground and/or ejection seats offer some protection from loss of airframe and life. Other methods require gross redundancy of controllers, actuators, equipment and propulsion systems to maintain function upon loss of one or more such redundantly equipped elements.

Referring to FIG. 1, an exemplary embodiment of system 100 for in-flight stabilization system is illustrated. In-flight stabilization system 100 is configured to identify a catastrophic failure of a flight control element and mitigating the failure and/or prevent catastrophic outcomes by attempting varying iterations of mitigating responses. In-flight stabilization system 100 can include a plurality of flight control elements 104A-N vehicle controller 108, sensor 112, flight component 116, heuristic database 124, or any combination thereof.

In an embodiment, flight control elements 104A-N can be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. While the illustrative embodiment of FIG. 1 shows in-flight stabilization system 100 having two flight control elements 104A-N, in other embodiments, in-flight stabilization system 100 may have any number of flight control elements.

With continued reference to FIG. 1, flight control elements 104A-N may each include any portion of an aircraft that can be moved or adjusted to affect altitude, airspeed velocity, groundspeed velocity or direction during flight. For example, a flight control element 104A-N may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, a flight control element 104A-N may include a rudder, which may include, without limitation, a segmented rudder. The rudder may function, without limitation, to control yaw of an aircraft. Also, a flight control element 104A-N may include other flight control surfaces such as propulsors, rotating flight controls, or any other structural features which can adjust the movement of the aircraft.

Still referring to FIG. 1, a flight control element 104 may include at least a propulsor. A propulsor, as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight.

In an embodiment, the propulsor may include a propeller, a blade, or any combination of the two. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Vehicle controller 108 may include and/or communicate with any computing device as described in this disclosure, including without limitation a microcontroller, microprocessor, digital signal processor (DSP) and/or system on a chip (SoC) as described in this disclosure. Further, vehicle controller 108 may include a single computing device operating independently, or may include two or more computing device operating in concert, in parallel, sequentially or the like; two or more computing devices may be included together in a single computing device or in two or more computing devices. In embodiments, vehicle controller 108 may be installed in an aircraft, may control the aircraft remotely, and/or may include an element installed in the aircraft and a remote element in communication therewith.

Vehicle controller 108 may include, be included in, and/or communicate with a mobile device such as a mobile telephone or smartphone. Further, vehicle controller 108 may communicate with one or more additional devices as described below in further detail via a network interface device. The network interface device may be utilized for commutatively connecting a vehicle controller 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

Vehicle controller 108 may include, but is not limited to, for example, a cluster of computing devices in a first location and a second computing device or cluster of computing devices in a second location. Vehicle controller 108 may include one or more computing devices dedicated to data storage, security, distribution of traffic for load balancing, and the like. Vehicle controller 108 may be configured to distribute one or more computing tasks as described below across a plurality of computing devices of computing device, which may operate in parallel, in series, redundantly, or in any other manner used for distribution of tasks or memory between computing devices. Vehicle controller 108 may also be implemented using a "shared nothing" architecture in which data is cached at the worker, in an embodiment, this may enable scalability of system 100 and/or computing device.

Still referring to FIG. 1, vehicle controller 108 may be communicatively connected to flight control elements 104A-N and sensor 112. As used herein, "communicatively connecting" is a process whereby one device, component, or circuit is able to receive data from and/or transmit data to another device, component, or circuit. A communicative connection may be achieved through wired or wireless electronic communication, either directly or by way of one or more intervening devices or components. Further, communicative connecting can include electrically coupling at least an output of one device, component, or circuit to at least an input of another device, component, or circuit. For example, via a bus or other facility for intercommunication between elements of a computing device as described in this disclosure. Communicative connecting may also include indirect connections via wireless connection, radio communication, low power wide area network, optical communication, magnetic, capacitive, or optical coupling, or the like.

Vehicle controller 108 may include any computing device or combination of computing devices as described in detail below in reference to FIG. 7. Vehicle controller 108 may include any processor or combination of processors as described below in reference to FIG. 7. Vehicle controller 108 may include a microcontroller. Vehicle controller 108 may be incorporated in an aircraft or may be in remote contact.

In an embodiment, and still referring to FIG. 1, vehicle controller 108 may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

Continuing to refer to FIG. 1, vehicle controller 108 may be designed and/or configured to perform any method, method step, or sequence of method steps in any embodiment described in this disclosure, in any order and with any degree of repetition. For instance, vehicle controller 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Vehicle controller 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in an embodiment where in-flight stabilization system 100 is incorporated into an electric aircraft, vehicle controller 108 may be programmed to operate an aircraft, including without limitation an electronic aircraft, to perform at a flight maneuver. A flight maneuver may include taxiing, takeoff, landing, stability control maneuvers, hovering, emergency response maneuvers, regulation of altitude, roll, pitch, yaw, speed, acceleration, or the like during any phase of flight. A flight maneuver may further include a flight plan or sequence of maneuvers to be performed during a flight plan. A flight maneuver can also include a change in altitude, change in speed, changed in travel direction, or the like. Further, a flight maneuver may include a landing, which may be a runway landing, defined herein as a landing in which a fixed-wing aircraft, or other aircraft that generates lift by moving a foil forward through air, flies forward toward a flat area of ground or water, alighting on the flat area and then moving forward until momentum is exhausted on wheels or (in the case of landing on water) pontoons. Momentum may be exhausted more rapidly by reverse thrust using propulsors 116, mechanical braking, electric braking, or the like. In an embodiment, a flight maneuver may include a vertical landing protocol, which may include a rotor-based landing such as one performed by rotorcraft such as helicopters or the like. In an embodiment, vertical takeoff and landing protocols may require greater expenditure of energy than runway-based landings. For example, vertical takeoff and landing protocols may, for instance, require substantial expenditure of energy to maintain a hover or near hover while descending or ascending, while the latter may require a net decrease in energy to approach or achieve stall. In an embodiment, vehicle controller 108 may be designed and configured to operate an aircraft via fly-by-wire. Vehicle controller 108 may enable fly-by-wire in response to an event or by the actions of others. In an embodiment, vehicle controller 108 may command an aircraft to operate via fly-by-wire when a failure of a component is detected.

Still referring to FIG. 1, sensor 112 can be communicatively connected to vehicle controller 108. Sensors, as described herein, are any device, module, and/or subsystems, utilizing any hardware, software, and/or any combination thereof to detect events and/or changes in the instant environment and communicate the information to the vehicle controller. Sensor 112 may be mechanically and/or communicatively coupled, as described above, to the aircraft. Sensor 112 may be configured to detect a failure event of a component of the aircraft. Sensors 112 may be used to monitor the status of the system of both critical and non-critical functions. Sensor 112 may be incorporated into vehicle or aircraft or be remote. As an example and without limitation, sensor 112 may be configured to detect the failure datum of a flight component of the aircraft. Failure datum may include, without limitation, an element of data identifying and/or describing a failure of at least a flight component has occurred. In an embodiment, sensor 112 detects the propulsor is not rotating at the speed which is necessary to maintain the flight plan. In another embodiment, sensor 112 may indicate that the energy source is not operating at the capacity necessary to maintain the flight plan. Sensor 112 is further configured to generate a failure datum of the flight component of an aircraft as a function of the failure event. Failure datum may include, as an example and without limitation, a determination that a propulsor is damaged or otherwise operating insufficiently, such as without limitation a determination that a propulsor such as a propeller is not generating torque, and/or that the propulsor and/or propeller is generating less torque than expected and/or necessary to produce a level of thrust required to maintain airspeed and/or lift. As a further example a degree of torque may be sensed, without limitation, using load sensors deployed at and/or around a propulsor and/or by measuring back electromotive force (back EMF) generated by a motor driving the propulsor.

Continuing to refer to FIG. 1, failure datum may include, without limitation, determination that one or more flight components 116 and/or systems for directional control, such as systems that enable an aircraft to maintain a heading, direct itself in a direction as indicated by a flight plan, and/or modify direction to perform one or more flight maneuvers as described above, is unable to function correctly. For instance, where steering is directed using rudders and/or ailerons, vehicle controller 108 may detect that one or more rudders and/or ailerons are failing to move as required to effect steering commands; detection may include, without limitation, detection that servomotors or other motors controlling motion of such components, are not functioning, using back EMF, unexpectedly high and/or low amounts of impedance, measures of torque, and/or power and/or current consumption or the like, as above for motors propelling one or more propulsors. Detection may include detection of motion and/or lack thereof of a component such as an aileron and/or rudder using sensor 112 that can detect motion. Detection of directional control failure, whether regulated by ailerons, rudders, and/or differential use of propulsors, may include a determination that expected shear stresses on the aircraft and/or one or more components thereof, as detected using load sensors, are less than they would be if the components were functioning correctly. Alternatively or additionally, detection may include detection that the aircraft is deviating from a route that would be expected if the steering components were functioning correctly.

Still referring to FIG. 1, failure datum may include determination that one or more power sources is losing capacity to provide sufficient power to at least a flight component; this may be determined based on any suitable measure of an energy source capacity and/or output. For instance, and without limitation, an output voltage of the energy source may reduce and/or collapse below a threshold level, a current output may reduce below a threshold level, and/or a detected internal resistance may increase unexpectedly. This may alternatively or additionally be detected by detection that one or more other flight components are consuming less power and/or producing less thrust, torque, force, or the like, which may indicate that less power is being provided to one or more components.

Still referring to FIG. 1, vehicle controller 108 is configured to generate a failure notification configured to indicate that sensor 112 has detected a failure datum. Vehicle controller 108 may be similar to or the same as any flight controller 304 as described herein. Vehicle controller 108 may be similar to or the same as any computing device or portion thereof as described herein. For the purposes of this disclosure, "failure notification" is any conveyance of information to one or more users and/or computing devices that any flight component has failed in a manner consistent with the description of failure herein. Failure notification may include one or more electrical signals transmitted and received by at least two electrical components. The electrical components may be any as described herein capable of transmitting, receiving, altering, conditioning, or otherwise communicating using electrical signals such as any flight component, any portion of any controller, computing device, chip, located locally or remotely, or another nondisclosed electrical component. Failure notification may include a visual notification presented on a graphical user interface (GUI). For the purposes of this disclosure, a "graphical user interface" is a device configured to present data or information in a visual manner to a user, computer, camera or combination thereof. Failure notification may be configured to display information regarding an energy source. Failure notification may include information about a compromised energy source, such as a threshold charge value, state of charge, and/or state of health. Failure notification may include information about a compromised flight component. The flight component may be similar or the same as any flight component as described herein, such as flight component 332 and/or flight component 116. Failure notification may be configured to prompt a user for an interaction. Failure notification may be configured to receive haptic, audio, visual, gesture, passkey, or other type of interaction from a user. Failure notification may perform one or more functions in response to the interaction from a user. In non-limiting examples, and without limitation, failure notification may transmit a signal to vehicle controller 108 when an affirmative interaction is received from the user, the signal indicating to transmit one or more signals to other components communicatively connected thereto. Failure notification may operate completely outside the communication between vehicle controller 108 and any other component communicatively connected thereto. For example, and without limitation, notification unit 120 may indicate to the user that energy source 104 has a certain level of charge and system 100 may operate autonomously to adjust one or more electrical commands regardless of the notification to the user.

With continued reference to FIG. 1, failure notification may be configured to alter the operation of any component as described herein. In nonlimiting examples, altering a component's operation may include initiating, shutting down, reversing, increasing, decreasing, modulating, fluctuating, or otherwise changing a components power output. The power production command datum may be configured to alter an energy source. Power production command datum may increase, decrease, modulate, fluctuate, activate, deactivate, change a path of at least an electrical characteristic associated with an energy source. Failure notification may, in a nonlimiting example, automatedly lower power consumption from an energy source in response to projected power-consumption need, power-production capability, or another detected datum or data. Failure notification may, in a nonlimiting example, automatedly increase power consumption from an energy source in response to the comparison. Failure notification may be configured to alter one or more electrical parameters associated with an energy source. For example, and without limitation failure notification may alter an energy source future energy output such as limit energy flow out of energy source for a certain amount of time, until a threshold amount of energy is flowed, energy storage limits, voltage, current, or resistance of any portion of an energy source, among others. Failure notification may be communicated to any of the components as described herein by any controller, flight controller, or computing device as described herein. In nonlimiting examples, altering a component's operation may include deflecting, actuating, extending, retracting turning, flapping, opening, closing, or otherwise moving a flight component.

Still referring to FIG. 1, failure notification may include an interaction with any user as described herein. Failure notification may include an approval by the user, denial by the user, accepting an automated suggestion by the user, displaying the failure notification to the user, such as with a GUI as described herein. Failure notification may be communicated to one or more users remotely located or onboard the aircraft. Failure notification may be voted on by one or more users, one or more computing devices or portions thereof, a combination thereof, or one or more other parties granted voting privileges by one or more of the systems described herein, in a nonlimiting embodiment. Failure notification may be suggested to the user visually, audially, haptically, a combination thereof, or another form of notification to a user. Failure notification may be interacted with visually, audially, haptically, or otherwise to indicate accepting, denying, or adjusting to the suggested failure notification. In non-limiting embodiments, failure notification may be configured to command any one or more flight elements, chipset components, flight components, energy sources, propulsors, loads, sensors, GUIs, controllers, flight controllers, sub-controllers, co-controllers, autonomous functions, semi-autonomous functions or modes, and/or non-autonomous functions or modes as described herein. Failure notification may be configured to alter the function of any of the above-described systems as described herein.

With continued reference to FIG. 1, flight component 116 may include power sources, control links to one or more elements, fuses, and/or mechanical couplings used to drive and/or control any other flight component. Flight component 116 may include a motor that operates to move one or more flight control components, to drive one or more propulsors, or the like. A motor may be driven by direct current (DC) electric power and may include, without limitation, brushless DC electric motors, switched reluctance motors, induction motors, or any combination thereof. A motor may also include electronic speed controllers (not shown) or other components for regulating motor speed, rotation direction, and/or dynamic braking.

Still referring to FIG. 1, flight component 116 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which in-flight system 100 may be incorporated.

In an embodiment, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source can include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Continuing to refer to FIG. 1, an energy source and/or motor may include or be commutatively connected to sensor 112 detecting one or more conditions of the energy source and/or motor. One or more conditions may include, without limitation, voltage levels, electromotive force, current levels, temperature, current speed of rotation, and the like. Sensors ma 112 can communicate a current status of an energy source to a person operating in-flight system 100 or a computing device. A computing device may include any computing device as described in this disclosure, including without limitation vehicle controller 108. Persons skilled in the art, upon reviewing the entirety of this disclosure, will be aware of various devices and/or components that may be used as or included at an energy source, a motor, and/or a circuit operating and/or connected thereto, as used and described herein.

Still referring to FIG. 1, sensor 112 may further include detecting electrical parameters. Electrical parameters may include, without limitation, voltage, current, ohmic resistance of a flight component. Sensor 112 may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. At least a sensor 112 may include at least a geospatial sensor. Sensor 112 may be located inside an aircraft; and/or be included in and/or attached to at least a portion of the aircraft.

Continuing to refer to FIG. 1, vehicle controller 108 can be configured to generate mitigating response 120 to be performed by a flight control element 104A-N of plurality of flight control elements 104A-N. Mitigating response 120, as used in this disclosure, can include data indicating any corrective and/or preventative measure to be taken in order to permit and/or enable safe traveling of the aircraft. Mitigating response 120 may, as a non-limiting example, be designed to allow aircraft to land safely. In an embodiment, vehicle controller 108 may contain in its memory, and/or heuristic database one or more alternative control algorithms applicable to one or more scenarios, such as a first alternative control algorithm to maintain attitude when a single lift propulsor is compromised or non-functional, as second alternative control algorithm applicable where two lift propulsors have failed, or the like. Mitigating response 120 may include a switch from hovering and/or rotor-based flight to a fixed-wing flight, landing, and/or gliding descent. As another example and without limitation, where a pusher motor has failed, mitigating response 120 may include use of list propulsors to fly forward to a suitable landing site using differential torque for steering and/or forward propulsion. In an embodiment, mitigating response 120 may include, as a further non-limiting example, use of one or more lift propulsors in a free-wheeling fashion to generate lift and/or retard descent in a manner analogous to a rotor of an autogiro.

With continued reference to FIG. 1, as a non-limiting example provided for illustrative purposes only, mitigating response 120 may include pulsing torque on rotors to increase the average torque while minimizing the net thrust. Mitigating response 120 may include, as another example and without limitation, utilizing a pusher rotor to stabilize the aircraft. Alternatively, mitigating response 120 may include, as a non-limiting example, utilizing flight surfaces in a non-coordinated way for instance by using ailerons differentially, imposing additional drag with a segmented rudder, or the like. Mitigating response 120 may also include altering a flight path of the aircraft; this may include, without limitation, selection of an alternative landing site and/or procedure, modification of a flight route to avoid an obstacle, such as going around a high object rather than attempting to lift above it, selection of an emergency landing location and/or process, or the like. Flight navigation facilities such as GPS, maps data, or the like may be used for modifications to flight route.

Still referring to FIG. 1, heuristic database 124 may include a memory configured to store any data structure for ordered storage and retrieval of data, which may be implemented as a hardware or software module. Heuristic database 124 may be implemented, without limitation, as a relational database, a key-value retrieval datastore such as a NOSQL database, or any other format or structure for use as a datastore that a person skilled in the art would recognize as suitable upon review of the entirety of this disclosure.

Heuristic database 124 may include input from experts, industry standards, and/or aviation databases as described in more detail below.

Figure 2:
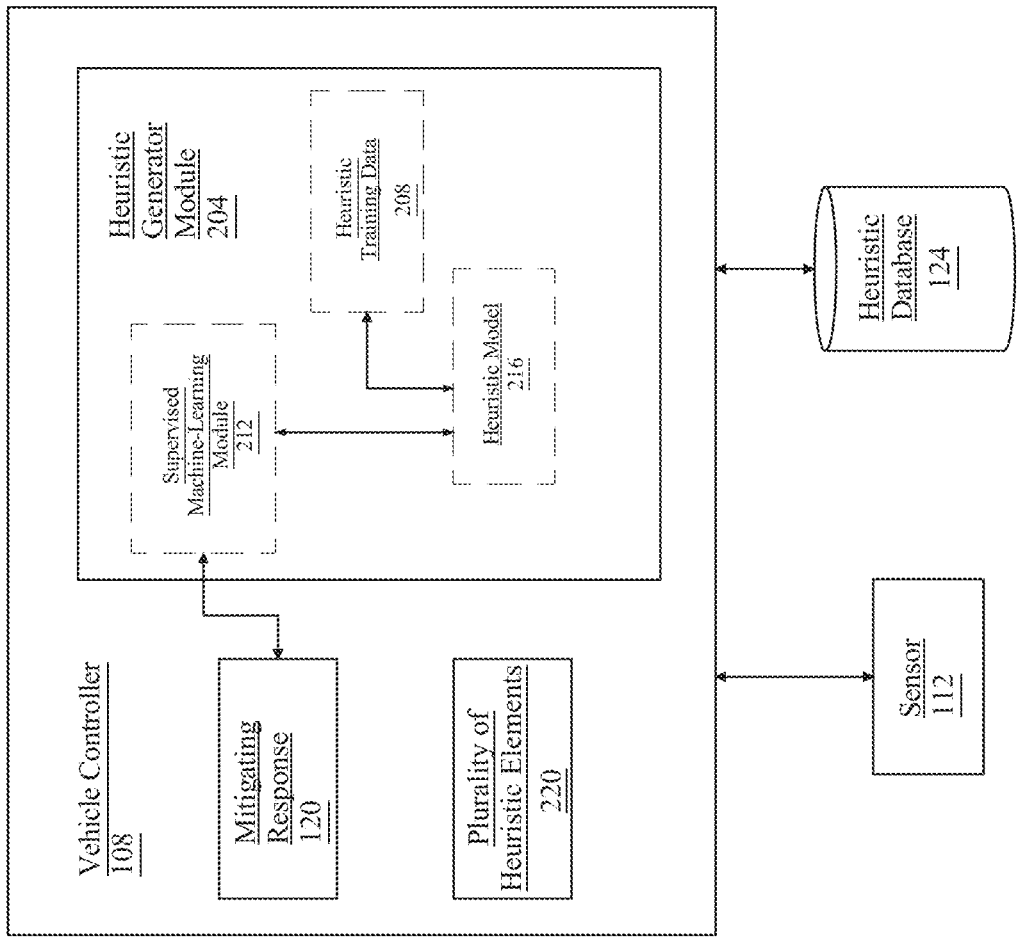
FIG. 2 is a block diagram illustrating an embodiment of a vehicle controller.

Referring now to FIG. 2, an embodiment 200 of vehicle controller 108 is illustrated. Vehicle controller 108 comprises heuristic generator module 204. Heuristic generator module 204 may be implemented as a hardware or software module, such as a microcontroller, microprocessor, digital signal processor (DSP), system on a chip (SoC), graphics processing unit (GPU), central processing unit (CPU), processor, controller or any combination thereof, as described herein. Heuristic generator module 204 is configured to receive heuristic training data 208 from heuristic database 124 correlating a failure datum to at least a heuristic element. Heuristic generator module 204 is further configured to generate, using supervised machine-learning module 212, a heuristic model 216 that receives the failure datum as an input and produces an output containing a plurality of heuristic elements 220. Vehicle controller 108 is further configured to receive the plurality of heuristic elements 220 generated at the heuristic generator module 204 and generate the mitigating response 120 as a function of the heuristic element 220.

With continued reference to FIG. 2, heuristic generator module 204 is configured to receive heuristic training data 208 from heuristic database 124 correlating a failure datum to at least a heuristic element. "Training data," as used in this disclosure, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations. For example, correlations may indicate causative and/or predictive links between categories of data elements, which may be modeled as relationships such as mathematical relationships by machine-learning processes as described in further detail below. In an embodiment, training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 2, training data may include one or more elements that are not categorized, that is to say, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by vehicle controller 108 may correlate any input data as described in this disclosure to any output data as described in this disclosure.

Still referring to FIG. 2, vehicle controller 108 and/or an additional computing device may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Further, linear regression models may include least absolute shrinkage and selection operator (LASSO) models, in which ridge regression is combined with multiplying the least-squares term by a factor of 1 divided by double the number of samples. Linear regression models may also include a multi-task lasso model wherein the norm applied in the least-squares term of the lasso model is the Frobenius norm amounting to the square root of the sum of squares of all terms. Additionally, linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 2, heuristic generator module 108 can receive heuristic training data 208 correlating a failure datum to at least a heuristic element 220. "Correlation" in a training data set may include any relation established therein linking one datum to another, including inclusion together in a data element, row, column, cell, or the like, and/or by giving each a common indicator and/or label indicative of their correlation in data used to create and/or compile training data. Correlation may include a relation established whereby at least an element of failure datum is correlated to at least a heuristic element based on data entries obtained from the same subject. Training set may include a plurality of entries, each entry correlating at least an element of failure datum to at least a heuristic element. Heuristic training data 208 can be received from a heuristic database 124. A "heuristic element" as used in this disclosure, includes any data that contains an algorithm and/or heuristic that responds to the failure datum to minimize the negative implications of the failure datum and aim to provide the highest degree of safety. Heuristic elements may include, for example and without limitation, algorithms and/or machine-learning processes that may adjust the flight plan of the aircraft to promote the greatest overall safety and minimal damage of the aircraft; such as switching from rotor-based flight to fixed-wing flight during landing and/or determining a closer landing area. Heuristic elements may include, as a further example and without limitation, algorithms and/or machine learning processes that may mitigate power to components of the aircraft by determining the greatest need and/or importance, such as dimming the lights to properly allocate power to vital flight components. Persons skilled in the art, upon reviewing the entirety of this disclosure, will be aware of various processes that may be used as heuristic elements consistently with this disclosure.

With continued reference to FIG. 2, heuristic generator module 204 can receive heuristic training data 208 from a heuristic database 124 correlating the failure datum to at least a heuristic element. Heuristic generator module 204 may receive heuristic training data 208 containing at least a failure datum that matches the failure datum received from sensor 112. For instance and without limitation, heuristic generator module 204 may receive heuristic training data 208 correlating decreasing speed to at least a heuristic element which may match a failure datum received from a sensor containing decreased rotations per second of the rotor. In yet another non-limiting example, heuristic generator module 204 may receive heuristic training data 208 correlating a deviation of the flight plan to at least a heuristic element which may match a failure datum received from sensor containing navigational data not matching the current path of flight. Heuristic generator module 204 may receive at least a failure datum containing a component classifier wherein the component classifier includes a component descriptor and receives heuristic training data 208 from a heuristic database 124 as a function of the at least a component descriptor. Component classifier may indicate a particular aircraft region, aircraft component, and/or aircraft system impacted by particular component failure. For instance and without limitation, failure datum such as vehicle controller malfunction may contain a component classifier that includes the flight control area. In yet another non-limiting example, failure datum such as rotor failure may contain a component classifier that includes affected aircraft system indicating the rotor-based flight system. Component descriptor includes an indication describing the extent to which a particular component failure has progressed. For instance and without limitation, failure datum such as engine failure may include a stage two component descriptor when two or more components will be affected by the failure. In yet another non-limiting example, failure datum such as aerodynamic spin may include a stage one component descriptor if the spin is imminent and has not already occurred. Heuristic generator module 204 receives heuristic training data 208 from heuristic database 124 as a function of at least a component descriptor. For instance and without limitation, heuristic generator module 204 may receive heuristic training data 208 correlating stage three aerodynamic stall to at least a heuristic element which may match a failure datum containing a disease stage descriptor received from a flight safety repository containing stage three aerodynamic stall. Persons skilled in the art, upon reviewing the entirety of this disclosure, will be aware of various data that may be used as heuristic training data consistently with this disclosure. Heuristic database 124 may contain tables organizing heuristic training data 208 by component type, component and/or failure classifier, and/or component and/or failure descriptor as described in more detail below.

With continued reference to FIG. 2, heuristic generator module 204 is configured to generate, using supervised machine-learning process 212, heuristic model 216. Heuristic generator model 204 can be configured to receive the failure datum as an input and produces an output containing a plurality of heuristic elements 220. Supervised machine-learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use elements of failure datum as inputs, heuristic elements as outputs and a scoring function representing a desired form of relationship to be detected between elements of failure datum and heuristic elements 220. Scoring function may, for instance, seek to maximize the probability that a given element of failure datum and/or combination of elements of failure datum is associated with a given heuristic element and/or combination of heuristic elements to minimize the probability that a given element of failure datum and/or combination of elements of failure datum is not associated with a given heuristic element and/or combination of heuristic elements. Scoring function may be expressed as a risk function representing an "expected loss" of an algorithm relating inputs to outputs, where loss is computed as an error function representing a degree to which a prediction generated by the relation is incorrect when compared to a given input-output pair provided in a training set. Persons skilled in the art, upon reviewing the entirety of this disclosure, will be aware of various possible variations of supervised machine-learning algorithms that may be used to determine relation between elements of failure datum and heuristic elements. In an embodiment, one or more supervised machine-learning algorithms may be restricted to a particular domain for instance, a supervised machine-learning process may be performed with respect to a given set of parameters and/or categories of parameters that have been suspected to be related to a given set of failure datum, and/or are specified as linked to an aircraft component and/or aircraft system covering a particular set of failure datum. As a non-limiting example, a particular set of current and/or voltage data received from a sensor may be typically used by pilots and/or aircraft flight crew to infer or predict various engine failures, and a supervised machine-learning process may be performed to relate those current and/or voltage data received from a sensor to the various heuristic elements. In an embodiment, domain restrictions of supervised machine-learning procedures may improve accuracy of resulting models by ignoring artifacts in training data. Domain restrictions may be suggested by experts and/or deduced from known purposes for particular evaluations and/or known tests used to evaluate failure datum. Additional supervised learning processes may be performed without domain restrictions to detect, for instance, previously unknown and/or unsuspected relationships between failure datum and heuristic elements.

Still referring to FIG. 2, heuristic generator module 204 can be configured to generate, using a supervised machine-learning process heuristic model 216 that outputs a plurality of heuristic elements 220. Supervised machine-learning processes may include classification algorithms, defined as processes whereby a computing device derives, from training data, a model for sorting inputs into categories or bins of data. Classification may be performed using, without limitation, linear classifiers such as without limitation logistic regression and/or naïve Bayes classifiers, nearest neighbor classifiers, support vector machines, decision trees, boosted trees, random forest classifiers, and/or neural network-based classifiers.

Still referring to FIG. 2, machine-learning processes as described in this disclosure may be used to generate machine-learning models. A "machine-learning model," as used in this disclosure, is a mathematical representation of a relationship between inputs and outputs, as generated using any machine-learning process including without limitation any process as described above and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning, for instance for multi-layered networks.

Still referring to FIG. 2, generating mitigating response 120 as a function of the plurality of heuristic elements 220 further comprises generating a loss function of the failure datum and the at least a heuristic element 220, minimizing the loss function, and selecting at least a heuristic element 220 as a function of minimizing the loss function. Generating loss function includes evaluating at least a heuristic element wherein the heuristic element contains a numerical scored response, assigning a weighted variable to the at least a heuristic element as a function of the implementation factor and minimize the loss function as a function of the weighted variable. An "implementation factor" as used in this disclosure, includes a numerical score reflecting the importance of a heuristic element as compared to other heuristic elements of the plurality of heuristic elements 220. A numerical score that contains a higher number may indicate a higher level of importance of a given implementation factor. A numerical scored response may be generated by a user, a machine-learning process, a simulation, and the like. The numerical score may reflect the importance of a heuristic element to a particular component. For instance and without limitation, a system may score an implementation factor such as loss of hovering capability as being more important than the loss of interior lighting because the lighting does not result in detrimental negative implications for aircraft and/or payload safety. In yet another non-limiting example, a system may score a heuristic element such as relocating the aircraft landing area more important over maintaining rotor-based flight while landing due to the importance of minimizing risk to the aircraft and aircraft contents. A weighted variable may be assigned to a heuristic element as a function of the implementation factor. A "weighted variable" as used in this disclosure, includes a value or weight for each observation in a heuristic element. In an embodiment, a heuristic element that has a larger weighted variable may have more influence as compared to a user implementation response that has a smaller weighted variable response. Generating the mitigating response 120 minimizes the loss function as a function of the weighted variable. Generating the mitigating response 120 may classify the heuristic element as a function of the numerical scored response. Classification may include sorting the heuristic elements 220 into particular categories containing shared characteristics as a function of the implementation factor containing a numerical scored response. Categories may include "optimal" for those implementation factors containing the highest numerical scored response. Categories may include "average" for those implementation factors containing an average numerical scored response. Categories may include "low" for those implementation factors containing a low numerical scored response. In an embodiment, generating the mitigating response 120 may be programed to know what numerical score ranges may fit within each defined category. Generating the mitigating response 120 may generate a classification label indicating a user implementation optimization factor as a function of the numerical scored response. Classification label may include data describing which category a particular heuristic element belongs to. Classification label may be generated utilizing a supervised machine-learning model that may be trained to match an input a particular category and classify it. Classification may be performed utilizing classification algorithms that include for example logistic regression, naïve bayes classifier, k-nearest neighbor, support vector machines, decision trees, boosted trees, random forest, and/or neural networks. Generating the mitigating response 120 selects at least a heuristic element containing an "optimal" classification label and minimizes the total variance from the at least a heuristic element containing an optimal classification label.

Figure 3:
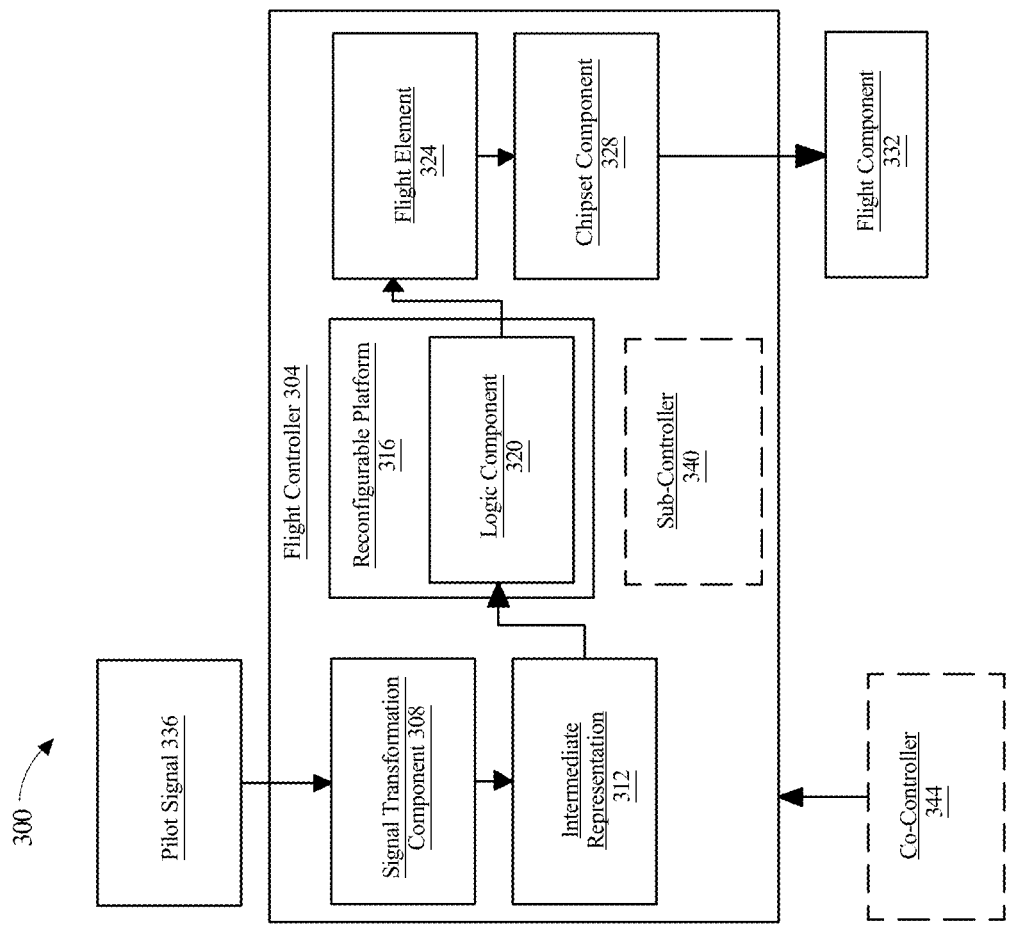
FIG. 3 is a block diagram illustrating an exemplary embodiment of a flight controller.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may be similar to or the same as vehicle controller 108 or any other controller as described herein. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal.

In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k-1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. Flight component 332 may be similar to or the same as flight component 116 as described herein. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an autocode, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
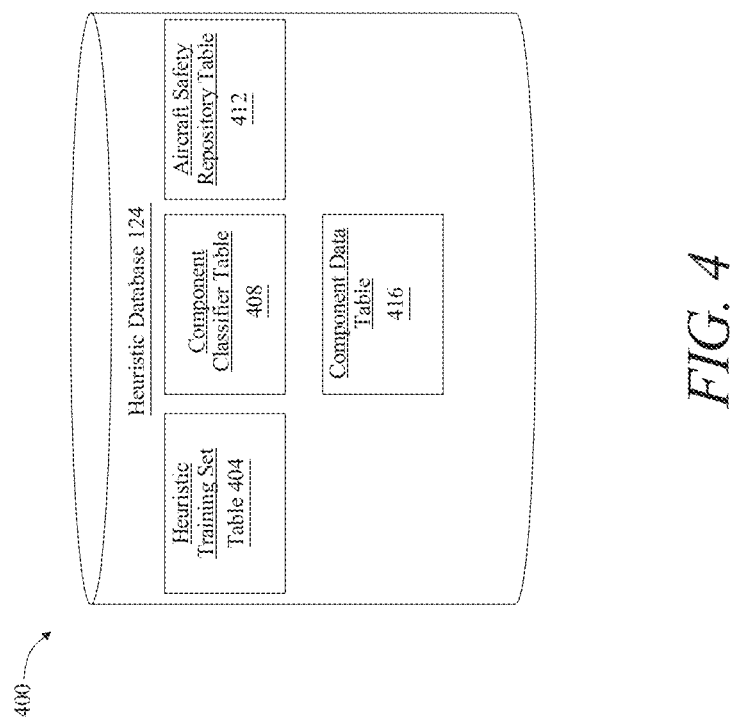
FIG. 4 is a schematic representation illustrating an embodiment of a heuristic database.

Referring now to FIG. 4, an embodiment 400 of heuristic database 124 is illustrated. Heuristic database 124 may organize data stored in heuristic database 124 according to one or more database tables. One or more database tables may be linked to one another by, for instance, common column values. For instance, a common column between two tables may include an identifier of a failure datum, which may be linked to a component classifier. Persons skilled in the art, upon reviewing the entirety of this disclosure, will be ware of various ways in which one or more database tables may be linked to one another.

With continued reference to FIG. 4, one or more tables contained within heuristic database 124 may include heuristic training set table 404. Heuristic training set table 404 may include one or more entries containing heuristic training sets organized by failure datum. For instance and without limitation, heuristic training set table 404 may include a first entry containing a heuristic training set organized by failure datum such as energy source depletion and a second entry containing a heuristic training set organized by failure datum such as motor malfunction. One or more tables contained within heuristic database 124 may include component classifier table 408. Component classifier table 408 may include one or more entries containing heuristic training sets organized by component classifiers. For instance and without limitation, component classifier table 408 may include a first entry containing a heuristic training set pertaining to rotor failure of located on the $2^{nd}$ rotor on the left airfoil and a second entry containing a heuristic training set pertaining to energy source depletion affecting the first battery of a module of batteries connected in series. One or more tables contained within heuristic database 124 may include aircraft safety repository table 412. Aircraft safety repository table 412 may include one or more entries containing data from aviation networks, aviation safety organizations and/or accident databases organized by component classifiers. For instance and without limitation, data from aviation networks, aviation safety organizations and/or accident databases organized by component classifiers may include data from Aviation Safety Network (ASN) databases, Aviation Safety Reporting System, National Transportation Safety Board (NTSB) Aviation Accident Database, and the like. One or more tables contained within heuristic database 124 may include component data table 416. Component table 416 may include one or more entries containing data collected from aviation databases organized by flight component. For instance and without limitation, data from aviation databases such as Federal Aviation Administration (FAA) databases, detailed aircraft information database, aircraft characteristics databases, aircraft technical data, and the like. Persons skilled in the art, upon reviewing the entirety of this disclosure, will be aware of various additional methods whereby novel terms may be separated from already-classified terms and/or synonyms therefore, as consistent with this disclosure.

Figure 5:
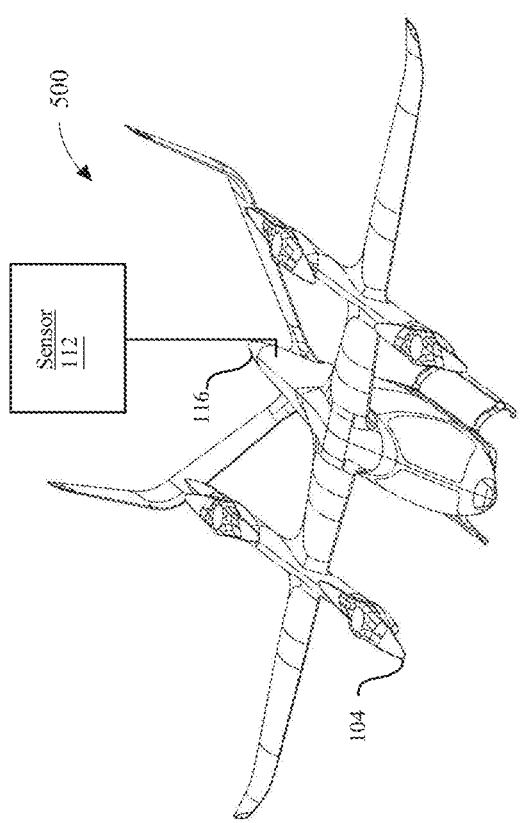
FIG. 5 is a diagrammatic representation of an electric aircraft.

Referring now to FIG. 5, in-flight system 100 may be incorporated into an electrically powered aircraft 500. In embodiments, electrically powered aircraft 500 may be an electric vertical takeoff and landing (eVTOL) aircraft. Electrically powered aircraft 500 may include flight control elements 104A-N each communicatively and/or mechanically flight control element 104A-N vehicle controller 108. A flight control element includes any flight control element as described above in reference to FIG. 1-3. Electric aircraft 500 may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Continuing to refer to FIG. 5, an illustration of forces is illustrated in an electric aircraft. During flight, a number of forces may act upon the electric aircraft. Forces acting on an aircraft 500 during flight may include thrust, the forward force produced by the rotating element of the aircraft 500 and acts parallel to the longitudinal axis. Drag may be defined as a rearward retarding force which is caused by disruption of airflow by any protruding surface of the aircraft 500 such as, without limitation, the wing, rotor, and fuselage. Drag may oppose thrust and acts rearward parallel to the relative wind. Another force acting on aircraft 500 may include weight, which may include a combined load of the aircraft 500 itself, crew, baggage and fuel. Weight may pull aircraft 500 downward due to the force of gravity. An additional force acting on aircraft 500 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Figure 6:
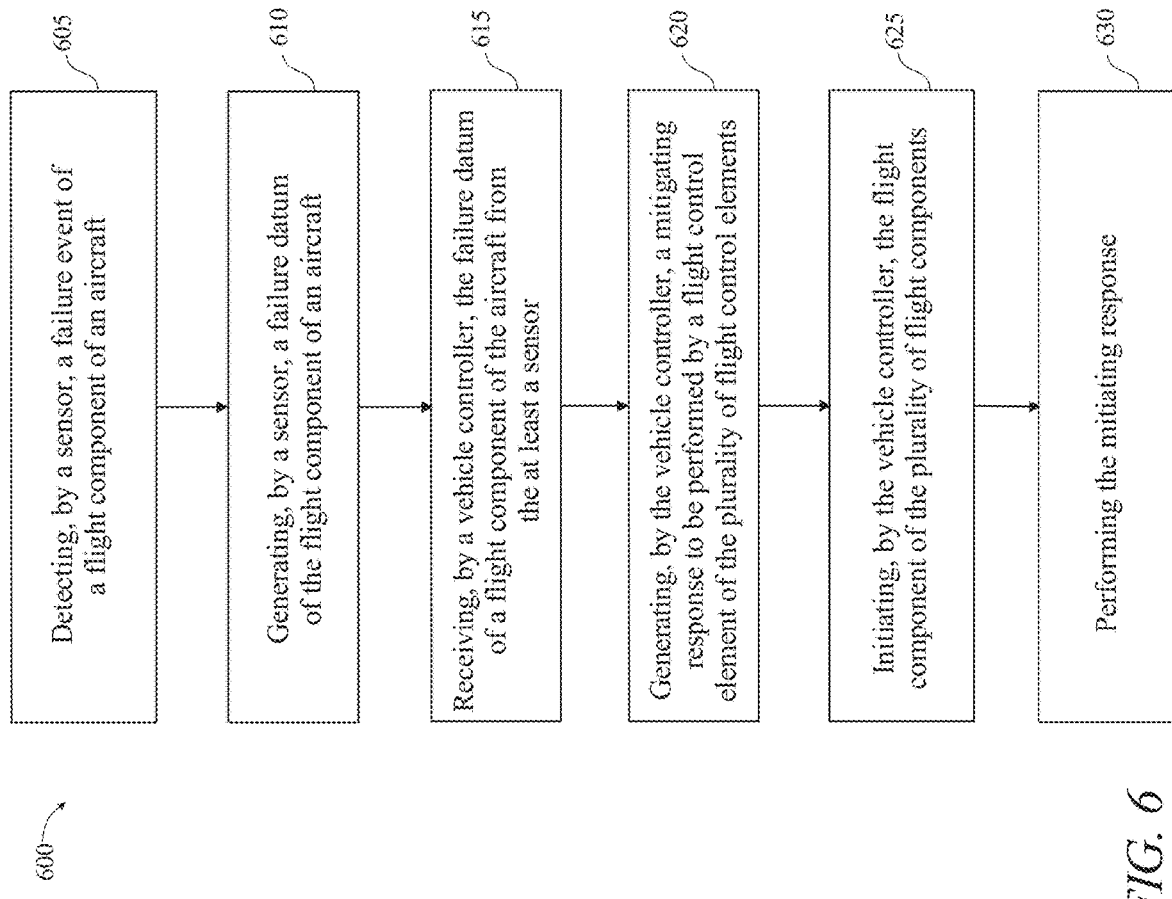
FIG. 6 is a flow diagram illustrating a method of in-flight stabilization.

Now referring to FIG. 6, a flow diagram illustrating a method 600 of in-flight stabilization system is shown. At step 605, sensor 112 detects a failure event of a flight component 116 and outputs the failure datum of a flight component 116 of an aircraft. Detecting, as described herein, may include reading parameters and/or receiving data from flight component 116 indicating a failure. A failure event may include any failure event as described above, including an element of data identifying a failure of at least a flight component has occurred. At step 610, sensor 112 generates a failure datum of a flight component of an aircraft. A failure datum may include any failure datum as described above, including an element of data describing a failure of at least a flight component has occurred. The failure datum may be detected, for instance, using any means or method as described above, including using sensor 112 and/or via a mechanically and/or communicative connection between vehicle controller 108 and a flight component 116. As an example and without limitation, failure datum may determine that the propulsor is not rotating at the speed which is necessary to maintain the flight plan. In another embodiment, sensor 112 connected to flight component 116 may indicate that the energy source is not operating at the capacity necessary to maintain the flight plan. Failure datum may include, without limitation, a determination that a propulsor is damaged or otherwise operating insufficiently, such as without limitation a determination that a propulsor such as a propeller is not generating torque, and/or that the propulsor and/or propeller is generating less torque than expected and/or necessary to produce a level of thrust required to maintain airspeed and/or lift; a degree of torque may be sensed, without limitation, using load sensors deployed at and/or around a propulsor and/or by measuring back electromotive force (back EMF) generated by a motor driving the propulsor. Additionally, failure datum may include, without limitation, determination that one or more components and/or systems for directional control, such as systems that enable an aircraft to maintain a heading, direct itself in a direction as indicated by a flight plan, and/or modify direction to perform one or more flight maneuvers as described above, is unable to function correctly. For instance and without limitation, where steering is directed using rudders and/or ailerons, vehicle controller 108 may detect that one or more rudders and/or ailerons are failing to move as required to effect steering commands. Further, failure datum may include, without limitation, detection that servomotors or other motors controlling motion of such components, are not functioning, using back EMF, unexpectedly high and/or low amounts of impedance, measures of torque, and/or power and/or current consumption or the like, as above for motors propelling one or more propulsors. Failure datum may also include detection of motion and/or lack thereof of a component such as an aileron and/or rudder using sensors that can detect motion. Failure datum, whether regulated by ailerons, rudders, and/or differential use of propulsors, may include a determination that expected shear stresses on aircraft 500 and/or one or more components thereof, as detected using load sensors, are less than they would be if the components were functioning correctly. Alternatively or additionally, failure datum may include detection that aircraft 500 is deviating from a route that would be expected if the steering components were functioning correctly.

Still referring to FIG. 6, failure datum may include determination that one or more power sources is losing capacity to provide sufficient power to at least a flight component; this may be determined based on any suitable measure of energy source capacity and/or output. For instance, and without limitation, an output voltage of an energy source may reduce and/or collapse below a threshold level, a current output may reduce below a threshold level, and/or a detected internal resistance may increase unexpectedly. This may alternatively or additionally be failure datum, wherein one or more other flight components are consuming less power and/or producing less thrust, torque, force, or the like, which may indicate that less power is being provided to one or more components. A flight component 116 may include any flight component as described above in reference to FIG. 1-4. A flight component may further include, without limitation, a propulsor, a motor, a rudder, and the like. Persons skilled in the art, upon reviewing the entirety of this disclosure, will be aware of various failure datums, and techniques for detecting such datums, consistent with this disclosure.

Continuing to refer to FIG. 6, at step 615, vehicle controller 108 receives a failure datum relating to a flight component 116 from the sensor 112. The failure datum includes any failure datum as described above in reference to FIGS. 1-5. Vehicle controller 108 may determine if the failure datum of at least a flight component 116 sufficiently serve to compromise flight. This may include a determination that a detected failure is actually or potentially a catastrophic failure. Catastrophic failures may include loss of steering, loss of power, loss of any function of the aircraft 500 which will immediately or in a short time cause the aircraft 500 to enter into a situation where it is almost certain that it will crash and cause a loss of life, cargo and integrity of the aircraft. Examples of catastrophic failures may include, without limitation, loss of propulsor, loss of energy or power, loss of rudder function, and the like.

With continued reference to FIG. 6, at step 620, vehicle controller 108 generates a mitigating response to be performed by a flight control element 104A-N of the plurality of flight control elements 104A-N. Mitigating response may, as a non-limiting example, be designed to allow aircraft 500 to land safely. Mitigating response, may include without limitation, any mitigating response as described above in reference to FIGS. 1-5. In an embodiment, mitigating response may contain one or more alternative control algorithms applicable to one or more scenarios, such as a first alternative control algorithm to maintain attitude when a single lift propulsor is compromised or non-functional, as second alternative control algorithm applicable where two lift propulsors have failed, or the like. A mitigating response may include a switch from hovering and/or rotor-based flight to a fixed-wing flight, landing, and/or gliding descent; likewise, where a pusher motor has failed, a mitigating response may include use of list propulsors to fly forward to a suitable landing site using differential torque for steering and/or forward propulsion. A mitigating response may include use of one or more lift propulsors in a free-wheeling fashion to generate lift and/or retard descent in a manner analogous to a rotor of an autogiro.

In an embodiment, and still referring to FIG. 6, generating a mitigating response may include receiving, by heuristic generator module 204, heuristic training data 208 from heuristic database 124 correlating a failure datum to at least a heuristic element and generating, by the heuristic generator module 204 using a supervised machine-learning process, a heuristic model 216 that receives failure datum as an input and produces an output containing a plurality of heuristic elements 220. Alternatively or additionally, a heuristic element may be identified using a model and/or heuristic that weighs multiple detected factors and selects a heuristic element as a result. Heuristic and/or model may be generated by vehicle controller 108 and/or another computing device using methods including without limitation machine-learning processes. A machine learning process is a process that automatedly uses a body of data known as "training data" and/or a "training set" to generate an algorithm that will be performed by a computing device/module to produce outputs given data provided as inputs, as described in further detail above in reference to FIGS. 1-4.

Still referring to FIG. 6, vehicle controller 108 may perform one or more machine-learning processes as described above in reference to FIGS. 1-5 on vehicle controller 108. Alternatively or additionally, vehicle controller 108 may receive a machine-learning model and/or heuristic derived from a machine-learning model from another computing device. Receiving machine-learning model and/or heuristic may include, without limitation, reconfiguration of a reconfigurable circuit as described above to enact and/or perform the machine-learning model and/or heuristic. Alternatively or additionally, machine-learning model and/or heuristic may be stored in memory of vehicle controller 108 and/or heuristic database 124.

In an embodiment, and still referring to FIG. 6, one or more mitigating responses, including without limitation one or more alternative control algorithms as described above, may be generated using machine learning and/or neural net training algorithms as described above. For instance, and without limitation, training data may be assembled including entries correlating sensor data sets, flight maneuver actions, and outcomes. As a non-limiting example, a set of flight maneuver options, including without limitation exemplary options as described below, such as patterns of power (increased, decreased, pulsed) provided to one or more functioning propulsors, steering using rudders, ailerons, or the like, may have labels and/or values associated with each item; these may be correlated in a training data element with a set of sensor data input values corresponding to a circumstance under which sets and/or sequences of flight maneuver options may have succeeded in preventing damage or loss of life, or may have succeeded in maintaining control of an aircraft. Machine-learning algorithms and/or neural net algorithms may be used as described above to determine combinations and/or sequences of flight maneuvers that are effective given combinations and/or sequences of sensor input.

With continued reference to FIG. 6, generating a mitigating response further comprises vehicle controller 108 receiving the plurality of heuristic elements 220 generated by the heuristic generator module 204, and generating the mitigating response as a function of the at least a heuristic element. The heuristic element may include any heuristic element as described above in reference to FIGS. 1-5. Generating the mitigating response as a function of the plurality of heuristic elements 220 further includes generating a loss function as a function of the failure datum and the at least a heuristic element. Vehicle controller 108 generates a loss function utilizing any of the methods as described above in reference to FIGS. 1-5.

Still referring to FIG. 6, generating the mitigating response as a function of the plurality of heuristic elements 220 further includes minimizing the loss function. Vehicle controller 108 may minimize the loss function by selecting a heuristic element with a small variable that may minimize the loss function. Vehicle controller 108 is further configured to generate the mitigating response by selecting at least a heuristic element as a function of minimizing the loss function. Vehicle controller 108 may utilize the selected mitigating response containing a small value variable to minimize a heuristic element containing a large variable or weight. Mitigating responses containing large variables or weight may be classified to contain optimal classification labels.

With continued reference to FIG. 6, vehicle controller 108 may attempt various categories and/or examples of maneuver techniques and/or mitigating responses as described above. Selection and/or attempt of mitigation responses may be performed, without limitation, using a calculation loop involving internal, external and environmental sensors datum into vehicle controller 108 to calculate the most probable flight plan and maneuver to ensure safe and efficient landing. Artificial intelligence and simulation offer the ability to find a "least wrong" or best-match answer and/or to add dimensions of non-linear thrust to a mitigating response and/or solution via approximation using, e.g., regression and therefore stabilize the aircraft, possibly with some motion, while the aircraft is safely returned to the ground. As a non-limiting example provided for illustrative purposes only, mitigating response may include pulsing torque on rotors to increase the average torque while minimizing the net thrust. Mitigating response may include utilizing a pusher rotor and/or a combination of pusher rotors to stabilize the aircraft. Further, without limitation, mitigating response may include a puller rotor and/or a combination of puller rotors. Mitigating response may include utilizing flight surfaces in a non-coordinated way for instance by using ailerons differentially, imposing additional drag with a segmented rudder, or the like. Mitigating response may include altering a flight path of the aircraft; this may include, without limitation, selection of an alternative landing site and/or procedure, modification of a flight route to avoid an obstacle, such as going around a high object rather than attempting to lift above it, selection of an emergency landing location and/or process, or the like. Flight navigation facilities such as GPS, maps data, or the like may be used for modifications to flight route.

For instance, and without limitation, vehicle controller 108 May store storing the plurality of heuristic elements 220, the mitigating response 120, and the failure datum in heuristic database 124. At least a heuristic database, as described herein, includes any heuristic database 124, as described above in further detail in reference to FIGS. 1-4. Datasets contained within heuristic database 124 may be categorized and/or organized by any of the methodologies as described above in reference to FIG. 1 and FIG. 4. Storing the plurality of heuristic elements 220, the mitigating response 120, and the failure datum in heuristic database 124 in heuristic database 124 may include any method and/or combination of methods of storing as described above in reference to FIGS. 1-5.

Continuing to refer to FIG. 6, at step 625, vehicle controller 108 may initiate a flight component 104. Initiating may include, without limitation, any means and/or combination of means of initiation as described above in reference to FIGS. 1-5. At step 630, initiating the flight component 104 further includes performing the mitigating response. Performing the mitigating response may include any means and/or combination of means of performing as described above in reference to FIGS. 1-5. The mitigating response, as described herein, includes any mitigating response as described in the entirety of this disclosure. Performing a mitigating response may include, as an example and without limitation, a flight maneuver, such as pulsing a propulsor of a plurality of propulsors, wherein a vehicle controller may execute a command to allow an energy source to send energy to a motor in order to pulse the propulsor. Pulsing may keep the propulsor working in order to maintain thrust and keep the aircraft in-flight. A flight maneuver may further include, as a non-limiting example, utilizing a rudder to guide the aircraft to a specific location. As another example and without limitation, performing a mitigating response may include utilizing a pusher rotor to stabilize the aircraft 500. As another example and without limitation, performing a mitigating response may include utilizing at least a flight component 104 surface in a non-coordinated way. flight control element 104A-N

Figure 7:
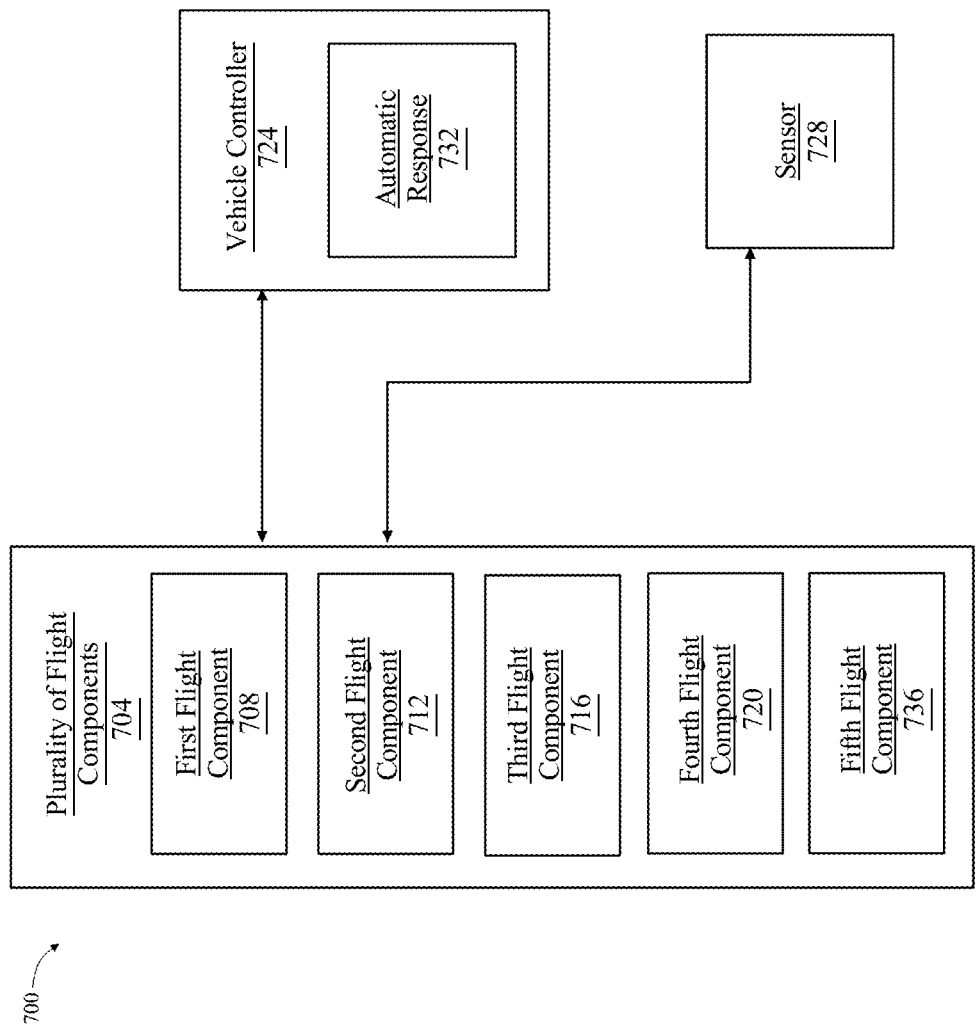
FIG. 7 is a block diagram depicting an exemplary embodiment for an in-flight stabilization system.

Referring now to FIG. 7, an exemplary embodiment of system 700 for an in-flight stabilization system is illustrated. In-flight stabilization system 700 is configured to identify a catastrophic failure of a flight component and mitigating the failure and/or prevent catastrophic outcomes by performing an automatic response, such that the response asserts an angular rotation about a perpendicular axis. In-flight stabilization system 700 can include a plurality of flight components 704, vehicle controller 724, sensor 728, automatic response 732, or any combination thereof.

In an embodiment, plurality of flight components 704 can be mechanically coupled to the aircraft. As described above in further detail in reference to FIG. 1, a person of ordinary skill in the art would understand "mechanically coupled" to mean that at least a portion of a device, component, or circuit is connected to at least a portion of the aircraft via a mechanical coupling. Said mechanical coupling can include, for example and without limitation, any mechanical coupling as described above in further detail. The aircraft can include any aircraft as described in the entirety of this disclosure. For example, the aircraft may include an electric aircraft, as described above in reference to FIG. 5. Plurality of flight components 704 may include any flight component as described in further detail in the entirety of this disclosure. For example and without limitation, plurality of flight components 704 may include power sources, control links to one or more elements, fuses, and/or mechanical coupling used to drive and/or control any other flight component, such as a motor and/or an energy source, as described in further detail above in reference to FIG. 1. Further, plurality of flight components 704 can include, for example and without limitation, a pair of flight control elements, wherein each flight control element may include any flight control element as described above in further detail. For example and without limitation, a flight control element may include any portion of an aircraft that can be moved or adjusted to affect altitude, airspeed velocity, ground speed velocity, or direction during flight, such as a propulsor, a rotating element, an alerion, a rudder, and the like, as described in further detail above in reference to FIG. 1.

Continuing to refer to FIG. 7, plurality of flight components 704 includes a first flight component 708. "First flight component" as described herein, is the flight component of the first pair of flight components operating at a degraded capacity, such that the output of the first flight component has degraded to the point of catastrophic failure. Examples of catastrophic failure can include, for example and without limitation, loss of propulsor, loss of energy or power, loss of rotor function, loss of motor, and the like, as described above in further detail. First flight component 708 may include any flight component of plurality of flight components 704, as described above in further detail. Plurality of flight components 704 is further configured to include a second flight component 712. "Second flight component" as described herein, is the flight component of the first pair of flight components located opposite and diagonal from the first flight component on the aircraft. In an embodiment, second flight component 712 is located on the opposing side of the aircraft body than that of first flight component 708 and second flight component 712 is located in a location of the aircraft diagonal to that of first flight component 708. Second flight component 712 may include any flight component of plurality of flight components 704, as described above in further detail. For example and without limitation, in an aircraft arrangement like a quadcopter, wherein there are four propulsors each located on the front and rear of each side of the fuselage, when first flight component is a front propulsor located on the left side of the fuselage, second flight component may be a rear propulsor located on the right side of the fuselage. In the same example, and without limitation, where first flight component is a front propulsor located on the right side of the fuselage of the quadcopter arrangement, second flight component may be a rear propulsor located on the left side of the fuselage. Further, in the instant example and without limitation, where first flight component is a rear propulsor located on the left side of the fuselage of the quadcopter arrangement, second flight component may be a front propulsor located on the right side of the fuselage. In the same non-limiting example, where first flight component is a rear propulsor located on the right side of the fuselage of the quadcopter arrangement, second flight component may be a front propulsor located on the left side of the fuselage.

With continued reference to FIG. 7, plurality of flight components 704 may include a third flight component 716. "Third flight component" as described herein, is a flight component of the plurality of flight components operating at a degraded capacity, such that the output of the third flight component has degraded to the point of catastrophic failure. Examples of catastrophic failure may include, for example and without limitation, loss of propulsor, loss of energy or power, loss of rotor function, loss of motor, and the like, as described in further detail in the entirety of this disclosure. Third flight component 716 may include any flight component of the plurality of flight components 704, as described above in further detail. Plurality of flight components 704 is further configured to include a fourth flight component 720. "Fourth flight component" as described herein, is the flight component of the plurality of flight components located opposite and diagonal from the third flight component on the aircraft. In an embodiment, fourth flight component 720 is located on the opposing side of the aircraft body than that of third flight component 716 and fourth flight component 720 is located in a location of the aircraft diagonal to that of third flight component 716. For example and without limitation, in an aircraft arrangement like a quadcopter, wherein there are four propulsors each located on the front and rear of each side of the fuselage, when the third flight component is the front propulsor located on the left side of the fuselage, the fourth flight component is the rear propulsor located on the right side of the fuselage. In the same example, and without limitation, where the third flight component is the front propulsor located on the right side of the fuselage of the quadcopter arrangement, the fourth flight component is the rear propulsor located on the left side of the fuselage. Further, in the instant example and without limitation, where the third flight component is the rear propulsor located on the left side of the fuselage of the quadcopter arrangement, the fourth flight component is the front propulsor located on the right side of the fuselage. In the same non-limiting example, where the third flight component is the rear propulsor located on the right side of the fuselage of the quadcopter arrangement, the fourth flight component is the front propulsor located on the left side of the fuselage.

Still referring to FIG. 7, in-flight stabilization system 700 includes a vehicle controller 724. Vehicle controller 724 may include and/or communicate with any computing device in this disclosure, including without limitation a microcontroller, microprocessor, digital signal processor (DSP) and/or system on a chip (SoC) as described in this disclosure. Vehicle controller 724 may include any vehicle controller as described above in further detail in reference to FIGS. 1-6. Vehicle controller 724, as described in further detail in the entirety of this disclosure, may be configured to distribute one or more computing tasks across a plurality of computing devices, which may operate in parallel, in series, redundantly, or in any other manner used for distribution of tasks or memory between computing devices. Vehicle controller 724 may be communicatively connected to plurality of flight components 704 and sensor 728. As described above in further detail in reference to FIG. 1, "communicatively connecting" is a process whereby one device, component or circuit is able to receive data from and/or transmit data to another device, component, or circuit. Communicatively connecting can include indirect connections via wireless connection, radio communication, low power wide area network, optical communication, magnetic, capacitive, or optical coupling, or the like, as described above in further detail.

Continuing to refer to FIG. 7, vehicle controller 724 may include a reconfigurable hardware platform. The reconfigurable hardware platform, as described in the entirety of this disclosure, is a component and/or unit of hardware that may be reprogrammed, such that, for instance, a data path between elements such as logic gates or other digital circuit elements may be modified to change an algorithm, state, logical sequence, or the like of the component and/or unit. As described above in further detail in reference to FIGS. 1-6, reconfigurable hardware platform may be reconfigured to enact any algorithm and/or algorithm selection process received from another computing device and/or created using machine-learning and/or neural net processes.

With continued reference to FIG. 7, sensor 728 may be communicatively connected to vehicle controller 724. Sensors, as described above in further detail in reference to FIG. 1, are any device, module, and/or subsystems, utilizing any hardware, software, and/or any combination thereof to detect events and/or changes in the instant environment and communicate the information to the vehicle controller. Sensor 728 may include any sensor as described in the entirety of this disclosure. Sensor 728 may be mechanically and/or communicatively coupled to the aircraft, as described above in further detail. Sensor 728 may be configured to detect a failure event of a flight component of the aircraft. Sensor 728 can detect a failure event of first flight component 708 of plurality of flight components 704. Further, sensor 728 can detect a failure event of third flight component 716 of plurality of flight components 704. "Failure event", as described herein, is an element of data identifying a failure of flight component has occurred. In an embodiment and without limitation, sensor 728 may indicate that the energy source is not operating at the capacity necessary to maintain the flight plan. In a further embodiment and without limitation, sensor 728 may indicate that the propulsor is not generating enough torque to maintain the flight plan. Sensor 728 may include any method, means, and/or process of detection by a sensor as described above in further detail.

Still referring to FIG. 7, sensor 728 is further configured to generate a failure datum associated to first flight component 708 of plurality of flight components 704 as a function of the failure event. Further, sensor 728 is configured to generate a failure datum associated to third flight component 716 of plurality of flight components 704 as a function of the failure event. "Failure datum", as used in the entirety of this disclosure, is an element of data describing the failure of the flight component that has occurred. In a non-limiting embodiment, the failure datum may include a determination that a propulsor, such as a rotor, is not generating torque, and/or that propulsor and/or rotor is generating less torque than expected and/or necessary to produce a level of thrust required to maintain airspeed and/or lift. As a further example, a degree of torque may be sensed, without limitation, utilizing load sensors deployed at and/or around a propulsor and/or by measuring back electromotive force (back EMF) generated by a motor driving the propulsor. Further, in a non-limiting embodiment, the failure datum may include the determination that one or more power sources is losing capacity to provide sufficient power to at least a flight component; this may be determined based on any suitable measure of an energy source capacity and/or output. For instance and without limitation, this may be detected by detection that one or more other flight components are consuming less power is being provided to one or more components. Failure datum may include any failure datum as described in further detail in the entirety of this disclosure.

Continuing to refer to FIG. 7, vehicle controller 724 is configured to receive the failure datum associated with first flight component 708 of plurality of flight components 704 from sensor 728. Receiving the failure datum associated with first flight component 708 from sensor 728 may include any means, method and/or process of receiving by vehicle controller 724 as described in further detail in the entirety of this disclosure. Vehicle controller 724 is further configured to initiate automatic response 732 as a function of the failure datum. "Automatic response", as described herein, is data indicating any corrective and/or protective measures to be taken in order to permit and/or enable the safe descent of the aircraft. Automatic response 732, as a non-limiting example, may be designed to allow the aircraft to land safely. As a further non-limiting example, automatic response 732 may be designed to prioritize fight controls in the order of pitch, roll, heave, and yaw, wherein rotation is the effect of prioritizing heave over yaw. Further, automatic response 732, as an example and without limitation, may be designed to flatten and/or reduce the descent spiral of the aircraft by generating an angular rotation about a perpendicular axis. Automatic response 732, as a further non-limiting example, may include utilizing a flight component to stabilize the aircraft, wherein the flight component may include a rotor. Persons skilled in the art, upon reviewing the entirety of this disclosure, will be aware of various data, corrective measures, and/or protective measures that may be used as automatic response, as used and described in the entirety of this disclosure.

With continued reference to FIG. 7, initiating automatic response 732 includes determining an autorotation inducement action for second flight component 712 to perform and commanding the second flight component 712 to perform the autorotation inducement action. "Autorotation inducement action", as described in the entirety of this disclosure, is the action inducing and/or facilitating autorotation of the aircraft. Autorotation is a state of flight wherein electrically powered aircraft 500 turns by the action of air moving up through the propulsion system as opposed to electric power driving the system. In an embodiment, the autorotation inducement action can include reconnecting power to the flight component associated with the failure datum. In an embodiment, commanding second flight component 712 to perform the autorotation inducement action includes reintroducing power to second flight component 712 of plurality of flight component 704, wherein second flight component 712 is supplied with the power to operate. For example and without limitation, commanding second flight component 712 to perform the autorotation inducement action includes reconnecting power to a rotor opposite and diagonal the rotor associated with the failure datum, such that reconnecting power to the rotor will initiate the prioritization of heave over yaw. In an embodiment and without limitation, autorotation inducement action may include shutdown of second flight component 712. "Shutdown", as used in this disclosure, is described as breaking the connection of the flight component with the power source, such that the flight component receives no power and can freely move. For example and without limitation, shutdown of second flight component 712 of plurality of flight components 704 can include eliminating the connection of power to the rotor opposite and diagonal the flight component associated to the failure datum, such that the rotor can freely rotate. Shutdown of second flight component 712 of plurality of flight components 704 may further include shutdown of first flight component 708 of plurality of flight components 704, such that there is no power received by first flight component 708 and second flight component 712.

Continuing to refer to FIG. 7, commanding second flight component 712 to perform the autorotation inducement action of second flight component 712 of plurality of flight components 704 further includes inducing a reversible rotation of second flight component 712 of plurality of flight component 704. "Reversible rotation", as used herein, is a rotation of the flight component in a direction opposite the initial rotation direction, wherein the initial rotation direction is the direction the rotor rotates as power is introduced to the aircraft. In an embodiment, reversible rotation is configured to prioritize flight controls such that heave is prioritized over yaw. Further in a non-limiting example, the prioritization of heave over yaw may include no adverse effects on yaw control. In an embodiment, the reversible rotation of second flight component 712 includes second flight component 712 rotating in a direction opposite the direction of rotation of third flight component 716 and/or fourth flight component 720. For example and without limitation, third flight component 716 is rotating in a clockwise direction at 540 RPM and the induction of the reversible rotation of second flight component 712 of plurality of flight components 704 induces rotation in the counter-clockwise direction at 540 RPM. In a further non-limiting example, second flight component 712 of plurality of flight components 704 is initially rotating in a counterclockwise direction as power is introduced to the aircraft, inducing a reversible rotation is second flight component 712 of plurality of flight component 704 rotating in a clockwise direction. In an embodiment, the reversible rotation will not be induced for second flight component 712 of plurality of flight components 704 unless the aircraft and/or vehicle controller is capable of performing both roll and pitch. In a further embodiment, inducing a reversible rotation of second flight component 712 of plurality of flight components 704 asserts an angular rotation about a perpendicular axis, such that the angular rotation will cause the aircraft to not flip over. Persons skilled in the art, upon reviewing the entirety of this disclosure, will be aware of various methods, means, and/or processes that may be used to command second flight component 712 to perform the autorotation inducement action, as used and described in the entirety of this disclosure.

Still referring to FIG. 7, vehicle controller 724 is further configured to receive the failure datum associated with third flight component 716 of plurality of flight components 704. Receiving the failure datum associated with third flight component 716 from sensor 728 may include any means, method and/or process of receiving by vehicle controller 724 as described in further detail in the entirety of this disclosure. Vehicle controller 724 is further configured to initiate automatic response 732 as a function of the failure datum.

Automatic response may include any automatic response as described above in further detail. Automatic response 732, as a non-limiting example, may be designed to allow the aircraft to land safely. As a further non-limiting example, automatic response 732 may be designed to prioritize fight controls in the order of pitch, roll, heave, and yaw, wherein rotation is the effect of prioritizing heave over yaw. Further, automatic response 732, as an example and without limitation, may be designed to flatten and/or reduce the descent spiral of the aircraft by generating an angular rotation about a perpendicular axis. Persons skilled in the art, upon reviewing the entirety of this disclosure, will be aware of various data, corrective measures, and/or protective measures that may be used as automatic response, as used and described in the entirety of this disclosure.

With continued reference to FIG. 7, initiating automatic response 732 may include determining an autorotation inducement action for fourth flight component 720 of plurality of flight components 704 to perform and commanding fourth flight component 720 to perform the autorotation inducement action may include any autorotation act as described above in further detail in the entirety of this disclosure. In an embodiment, commanding fourth flight component 720 to perform the autorotation inducement action includes reintroducing power to fourth flight component 720 of plurality of flight component 704, wherein fourth flight component 720 is supplied with the power to operate. For example and without limitation, commanding fourth flight component 720 to perform the autorotation inducement action includes reconnecting power to a rotor opposite and diagonal the rotor associated with the failure datum, such that reconnecting power to the rotor will initiate the prioritization of heave over yaw. In an embodiment and without limitation, autorotation inducement action may include shutdown of fourth flight component 720. Shutdown may include any shutdown as described in further detail in the entirety of this disclosure. For example and without limitation, shutdown of fourth flight component 720 of plurality of flight components 704 can include eliminating the connection of power to the rotor opposite and diagonal the flight component associated to the failure datum, such that the rotor is can freely rotate. Shutdown of fourth flight component 720 of plurality of flight components 704 may further include shutdown of third flight component 716 of plurality of flight components 704, such that there is no power received by third flight component 716 and fourth flight component 720.

Continuing to refer to FIG. 7, commanding fourth flight component 720 to perform an autorotation inducement action may include inducing a reversible rotation of fourth flight component 720 of plurality of flight component 704. Reversible rotation may include any reversible rotation as described in further detail in the entirety of this disclosure. In an embodiment, reversible rotation is configured to prioritize flight controls such that heave is prioritized over yaw. Further in a non-limiting example, the prioritization of heave over yaw may include no adverse effects on yaw control. In an embodiment, the reversible rotation of fourth flight component 720 includes fourth flight component 720 rotating in a direction opposite the direction of rotation of first flight component 708 and/or second flight component 712. For example and without limitation, first flight component 708 and/or second flight component 712 is rotating in a clockwise direction at 560 RPM and the induction of the reversible rotation of fourth flight component 720 of plurality of flight components 704 induces rotation in the counter-clockwise direction at 560 RPM. In a further nonlimiting example, fourth flight component 720 of plurality of flight components 704 is initially rotating in a counter-clockwise direction as power is introduced to the aircraft, inducing a reversible rotation is fourth flight component 720 of plurality of flight component 704 rotating in a clockwise direction. In an embodiment, the reversible rotation will not be induced for fourth flight component 720 of plurality of flight components 704 unless the aircraft and/or vehicle controller is capable of performing both roll and pitch. In a further embodiment, inducing a reversible rotation of fourth flight component 720 of plurality of flight components 704 asserts an angular rotation about a perpendicular axis, such that the angular rotation will cause the aircraft to not flip over. Persons skilled in the art, upon reviewing the entirety of this disclosure, will be aware of various methods, means, and/or processes that may be used to command fourth flight component 720 to perform the autorotation inducement action, as used and described in the entirety of this disclosure.

With continued reference to FIG. 7, initiating automatic response 732 may be further configured to include flight controller 724 initiating thrust of a fifth flight component 736 of plurality of flight components 704. "Fifth flight component" as described in the entirety of this disclosure, is a propeller is mounted behind the source of power of the aircraft. For example and without limitation, the fifth flight component may include a pusher propeller, wherein the drive shaft is in compression. As a further example and without limitation, fifth flight component 736 may include a puller propeller, wherein the drive shaft is in tension. Further, in a non-limiting example, fifth flight component may include a combination of pusher propellers and/or a combination of puller propellers. Fifth flight component 736 may be configured to rotate in any direction such that the rotation induces thrust of the aircraft. For example and without limitation, fifth flight component 736 of plurality of flight components may include a pusher propeller mechanically coupled to the tail of aircraft 500. As a further example and without limitation, fifth flight component 736 of plurality of flight components may include a puller propeller mechanically coupled to the tail of aircraft 500. Initiating thrust of fifth flight component 736, in an embodiment, is configured to impart yaw torque to the aircraft. The addition of yaw torque to the aircraft, by initiating thrust of fifth flight component 736 counters any roll-yaw coupling effects. Initiating thrust of fifth flight component 463 may be configured to enable flight control operations of the aircraft, such as cross-wind corrected hover and turns of hover mode of flight. Initiating thrust of fifth flight component 736 may be performed manually by the pilot, or automatically by vehicle controller 724. Persons skilled in the art, upon reviewing the entirety of this disclosure, will be aware of various methods, means, and/or processes that may be used to initiate thrust of fifth flight component 736, as used and described in the entirety of this disclosure.

Figure 8:
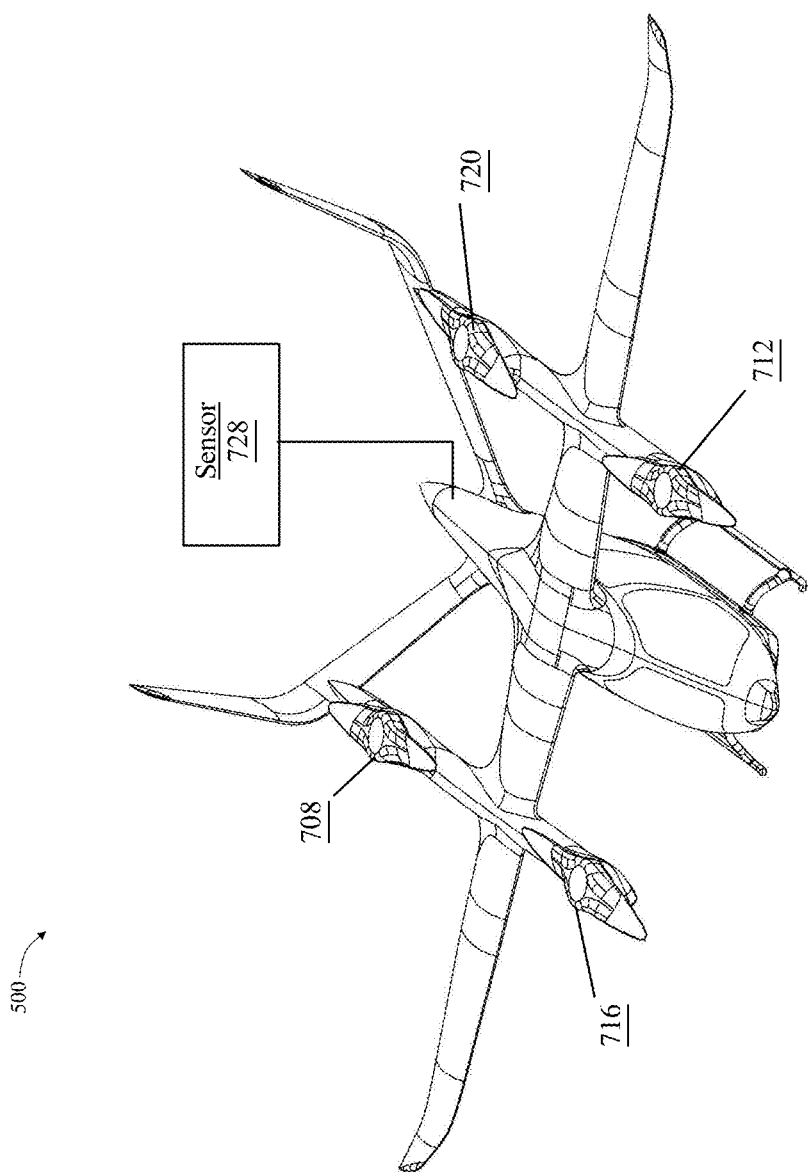
FIG. 8 is a diagrammatic representation of the instant embodiment in an electric aircraft.

Referring now to FIG. 8, in-flight stabilization system 700 may be incorporated into electrically powered aircraft 500. Electrically powered aircraft 500 may include any electrically powered aircraft as described in the entirety of this disclosure. Electrically powered aircraft 500 may include plurality of flight components 704 each communicatively and/or mechanically coupled to vehicle controller 724 and sensor 728. Plurality of fight components 704 may include any plurality of flight components as described in further detail in the entirety of this disclosure. Vehicle controller 724 may include any vehicle controller as described in further detail in the entirety of this disclosure. Sensor 728 may include any sensor as described in the further detail in the entirety of this disclosure. Plurality of flight components 704 of electrically powered aircraft 500 is configured to include first flight component 708 and second flight component 712. First flight component 708 may include any first flight component as described above in further detail in the entirety of this disclosure. Second flight component 712 can include any second flight component as described above in the entirety of this disclosure. Plurality of flight component 704 of electrically powered aircraft 500 is further configured to include third flight component 716 and fourth flight component 720. Third flight component 716 may include any third flight component as described above in further detail in the entirety of this disclosure. Fourth flight component 720 may include any fourth flight component as described above in further detail in the entirety of this disclosure.

Referring now to FIGS. 9A and 9B, an embodiment of in-flight stabilization system 700 is displayed. FIG. 9A displays plurality of flight components 704 mechanically coupled to an aircraft. In the embodiment, first flight component 708 and second flight component 712 are rotating in a counter-clockwise direction. First flight component 708 may include any first flight component as described above in the entirety of this disclosure. Second flight component 712 may include any second flight component as described above in further detail. Further, in the embodiment, third flight component 716 and fourth flight component 720 are rotating in a clockwise direction. Third flight component 716 may include any third flight component as described above in further detail. Fourth flight component 720 may include any fourth flight component as described above in further detail in the entirety of this disclosure. In the embodiment, the sum of motor torques and thrust torques produced by first flight component 708, second flight component 712, third flight component 716, and fourth flight component 720 provide the aircraft with roll, pitch, and yaw control. Further, in the embodiment, the sum of thrusts generated by first flight component 708, second flight component 712, third flight component 716, and fourth flight component 720 provides the aircraft with heave, such as altitude control. In the embodiment, to control yaw of the aircraft, third flight component 716 and fourth flight component 720 to spin on the diagonal, such that pitch or roll torque is not coupled with yaw. FIG. 9B displays an embodiment of initiation of automatic response 732. In the embodiment, a failure datum associated to first flight component 708 is received and as a result there is no power being transmitted to first flight component 708 causing no rotation to occur. Further, in the embodiment, second flight component 712 is commanded to perform the autorotation inducement action. Autorotation inducement action may include any autorotation inducement action as described in further detail in the entirety of this disclosure. The autorotation inducement action includes the second flight component 712 is rotating in a direction opposite the initial direction of rotation, wherein the second flight component 712 is commanded to perform rotation in a clockwise direction.

Figure 10A:
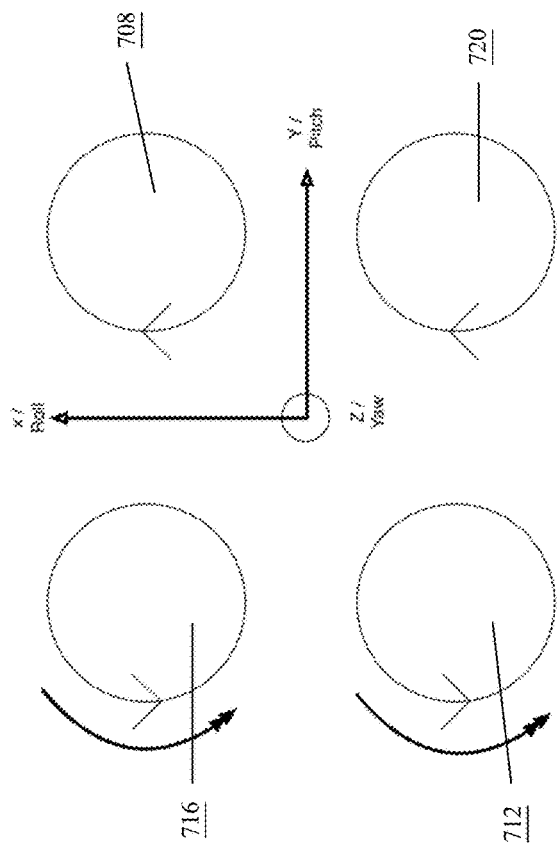
FIG. 10A-C is a diagrammatic representation of the instant embodiment.
Figure 10B:
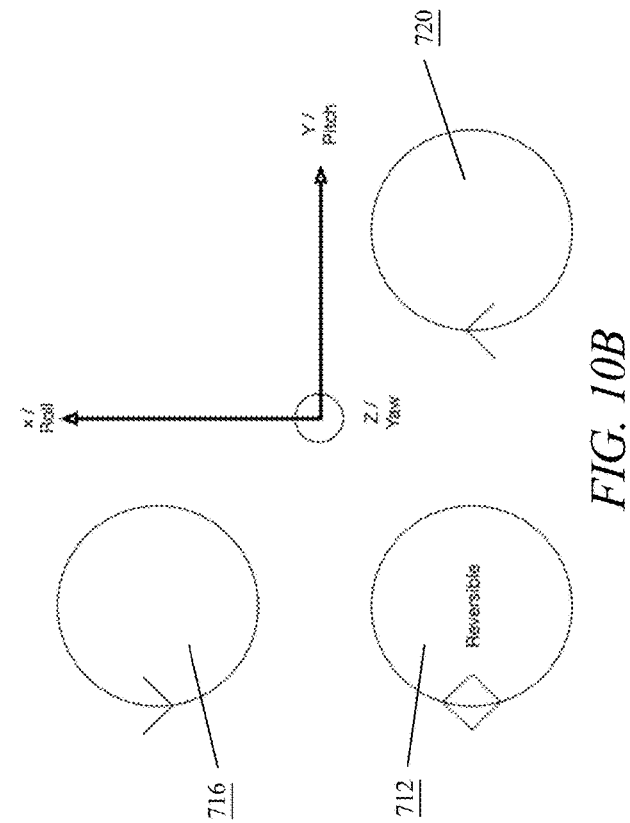
Figure 10C:
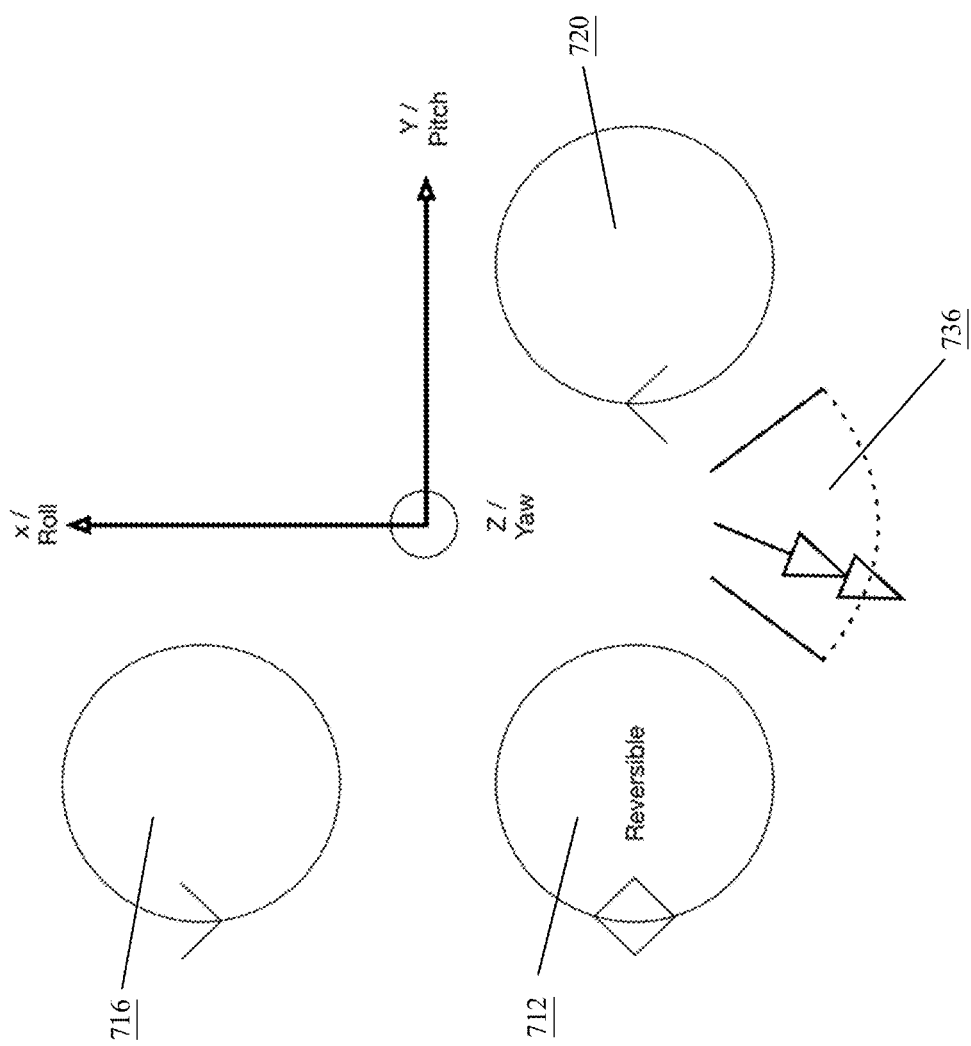

Referring now to FIGS. 10A, 10B, and 10C, an embodiment of in-flight stabilization system 700 is displayed. FIG. 10A displays plurality of flight components 704 mechanically coupled to an aircraft. In the embodiment, first flight component 708 and fourth flight component 720 are rotating in a clockwise direction. First flight component 708 may include any first flight component as described above in the entirety of this disclosure. Fourth flight component 720 may include any fourth flight component as described above in further detail in the entirety of this disclosure. Further, in the embodiment, second flight component 712 and third flight component 716 are rotating in a counter-clockwise direction. Second flight component 712 may include any second flight component as described above in further detail. Third flight component 716 may include any third flight component as described above in further detail. In the embodiment, control of roll and yaw can be controlled by increased rotation of the pair of flight components rotating in the same direction. For example and without limitation, with flight direction along the x-axis and second flight component 712 and third flight component 716 are rotating in a counter-clockwise direction and first flight component 708 and fourth flight component 720 are rotating in a clockwise direction, controlling right yaw of the aircraft corresponds with clockwise yaw and control of left yaw corresponds with counter-clockwise yaw. FIG. 10B displays an embodiment of initiation of automatic response 732. As a further non-limiting example, automatic response 732 may be designed to prioritize fight controls in the order of pitch, roll, heave, and yaw, wherein rotation is the effect of prioritizing heave over yaw. In the embodiment, a failure datum associated to first flight component 708 is received and as a result there is no power being transmitted to first flight component 708 causing no prioritization of heave over yaw to occur. Further, in the embodiment, second flight component 712 is commanded to perform the autorotation inducement action. Autorotation inducement action may include any autorotation inducement action as described in further detail in the entirety of this disclosure. The autorotation inducement action includes the second flight component 712 is rotating in a direction opposite the initial direction of rotation, wherein the second flight component 712 is commanded to perform rotation in a clockwise direction. In the embodiment, there is no uncompensated yaw torque corresponding with heave maintenance. FIG. 10C displays an embodiment of initiating thrust of fifth flight component 736. Fifth flight component 736 may include any fifth flight component as described above in further detail. In the embodiment, thrust generated by fifth flight component 736 can be configured to impact yaw torque, wherein the thrust is articulated and/or vectoring. Further, in the embodiment, initiating thrust of fifth flight component 736 is configured to decouple yaw control of the aircraft.

Figure 11:
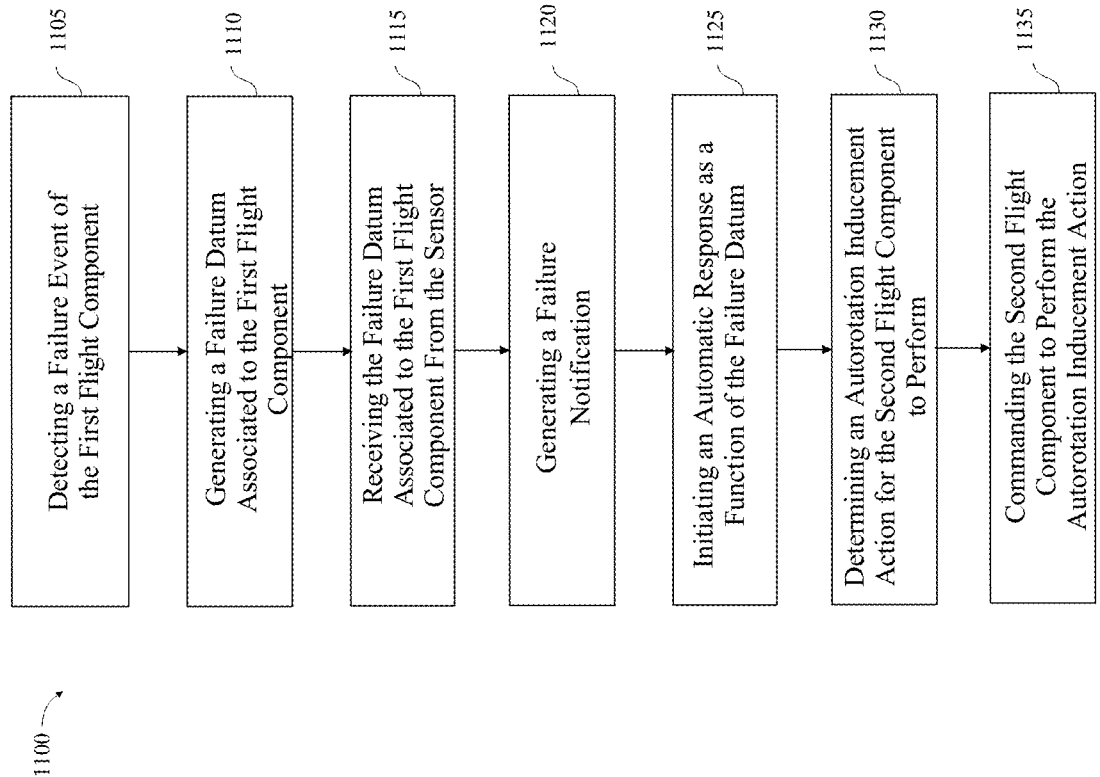
FIG. 11 is a flow diagram illustrating a method of in-flight stabilization.

Referring now to FIG. 11, a flow diagram illustrating a method 1100 of in-flight stabilization system is illustrated. At step 1105, sensor 728 detects a failure event of first flight component 708 of plurality of flight components 704 of an aircraft. Detecting, as described herein, may include reading parameters and/or receiving data from first flight component 708 of plurality of flight components 704 indicating a failure. A failure event may include any failure event as described above, including an element of data identifying a failure of first flight component 708 of plurality of flight components 704 has occurred. At step 1110, sensor 728 generates a failure datum associated to first flight component 708 of plurality of flight components 704 of the aircraft. The failure datum may include any failure datum as described above, including an element of data describing a failure of first flight component 708 of plurality of flight components 704. The failure datum may be detected, for instance, using any means or method as described above, including sensor 728 and/or via a mechanically and/or communicative connection between vehicle controller 724 and plurality of flight components 704. As an example and without limitation, the failure datum may include a determination that a propulsor, such as a rotor, is not generating torque, and/or that propulsor and/or rotor is generating less torque than expected and/or necessary to produce a level of thrust required to maintain airspeed and/or lift. As a further example, a degree of torque may be sensed, without limitation, utilizing load sensors deployed at and/or around a propulsor and/or by measuring back electromotive force (back EMF) generated by a motor driving the propulsor. Further, in a non-limiting embodiment, the failure datum may include the determination that one or more power sources is losing capacity to provide sufficient power to at least a flight component; this may be determined based on any suitable measure of an energy source capacity and/or output. For instance and without limitation, this may be detected by detection that one or more other flight components are consuming less power is being provided to one or more components. Persons skilled in the art, upon reviewing the entirety of this disclosure, will be aware of various failure datums, and techniques for detecting such datums, consistent with this disclosure.

Continuing to refer to FIG. 11, at step 1115, vehicle controller 724 receives the failure datum associated to first flight component 708 of plurality of flight components 704 from sensor 728. The failure datum includes any failure datum as described above in reference to FIGS. 1-8. Vehicle controller 724 may determine if the failure datum of first flight component 708 of plurality of flight component 704 sufficiently serve to compromise flight of the aircraft. This may include a determination that a detected failure is actually or potentially a catastrophic failure. Catastrophic failure may include loss of power, loss of any function of aircraft 500 which will immediately or in a short time cause aircraft 500 to enter a situation where it is almost certain that it will crash and cause a loss of life, cargo, ad/or integrity of the aircraft. Examples of catastrophic failures may include, without limitation, loss of propulsors, loss of rotors, loss of energy or power, loss of motor, and the like.

With continued reference to FIG. 11, at step 1120, vehicle controller 732, which may be the same as or similar to flight controller 304 or any other flight controller as described herein generates a failure notification. Failure notification may indicate or alert one or more users of the at least a failure of a flight component such as a compromised energy source or propulsor. Notification to the user by the failure notification may be in any form of communication as described herein such as through visual cues, heads-up displays, visors, goggles, projections, holograms, videos, pictures, graphical representations of data such as voltage over time, audio cues such as dings, chimes, bells, robotic voice recordings, prerecorded audio warning messages, tones, alarms, or the like. Notification to the user by failure notification may include haptic feedback such as vibrations, jostling of controls, resistance to control inputs, or the like, in non-limiting embodiments. Notification to the user by failure notification may be configured to prompt the user for an interaction such as an approval, denial, adjustment, or other manipulation of a command, such as a command to adjust one or more electrical parameters or outputs of other components within With continued reference to FIG. 11, at step 1125, vehicle controller 732 initiates automatic response 732 as a function of the failure datum. Automatic response 732 may include without limitation, any automatic response as described above in further detail in reference to FIGS. 1-8. Automatic response 732, as a non-limiting example, may be designed to allow the aircraft to land safely. As a further non-limiting example, automatic response 732 may be designed to prioritize fight controls in the order of pitch, roll, heave, and yaw, wherein rotation is the effect of prioritizing heave over yaw. Further, automatic response 732, as an example and without limitation, may be designed to flatten and/or reduce the descent spiral of the aircraft by generating an angular rotation about a perpendicular axis. Automatic response 732, as a further non-limiting example, may include utilizing a flight component to stabilize the aircraft, wherein the flight component may include a rotor. Persons skilled in the art, upon reviewing the entirety of this disclosure, will be aware of various data, corrective measures, and/or protective measures that may be used as automatic response, as used and described in the entirety of this disclosure.

Continuing to refer to FIG. 11, at step 1130, automatic response 732 further comprises determining an autorotation inducement action for the second flight component 712 to perform. Autorotation inducement action may include any autorotation act as described above in further detail in the entirety of this disclosure. In an embodiment and without limitation, autorotation inducement action may include shutdown of second flight component 712. Shutdown may include without limitation, any shutdown as described above in further detail in reference to FIGS. 1-8. For example and without limitation, shutdown of second flight component 712 of plurality of flight components 704 can include eliminating the connection of power to the rotor opposite and diagonal the flight component associated to the failure datum, such that the rotor can freely rotate. Shutdown of second flight component 712 of plurality of flight components 704 may further include shutdown of first flight component 708 of plurality of flight components 704, such that there is no power received by first flight component 708 and second flight component 712. Persons skilled in the art, upon reviewing the entirety of this disclosure, will be aware of various means, methods, and/or processes of breaking the connection of the flight component with the power source that may be used as shutdown, as used and described in the entirety of this disclosure.

Still referring to FIG. 11, at step 1135, automatic response 732 further comprises commanding second flight component 712 of plurality of fight components 704 to perform the autorotation inducement action. Autorotation inducement action may include without limitation any autorotation inducement action as described in further detail above in reference to FIGS. 1-8. In an embodiment, commanding second flight component 712 of plurality of fight components 704 to perform the autorotation inducement action includes reintroducing power to second flight component 712 of plurality of flight component 704, wherein second flight component 712 is supplied with the power to operate. For example and without limitation, commanding second flight component 712 of plurality of fight components 704 to perform the autorotation inducement action includes reconnecting power to a rotor opposite and diagonal the rotor associated with the failure datum, such that reconnecting power to the rotor will initiate prioritization of heave over yaw. Persons skilled in the art, upon reviewing the entirety of this disclosure, will be aware of various means, methods, and/or processes of reconnecting power to the flight component associated with the failure datum that may be used as the autorotation inducement action, as used and described in the entirety of this disclosure.

Still referring to FIG. 11, commanding second flight component 712 of plurality of fight components 704 to perform the autorotation inducement action may include inducing a reversible rotation of second flight component 712 of plurality of flight components 704, wherein the reversible rotation includes second flight component 712 rotating in a direction opposite third flight component 716 and/or fourth flight component 720. Reversible rotation may include without limitation, any reversible rotation as described in further detail above in reference to FIGS. 1-8. In an embodiment, the reversible rotation of second flight component 712 includes second flight component 712 rotating in a direction opposite the direction of rotation of third flight component 716 and/or fourth flight component 720. For example and without limitation, third flight component 716 and/or fourth flight component 720 is rotating in a clockwise direction at 540 RPM and the induction of the reversible rotation of second flight component 712 of plurality of flight components 704 induces rotation in the counter-clockwise direction at 540 RPM. In an embodiment, the reversible rotation will not be induced for second flight component 712 of plurality of flight components 704 unless the aircraft and/or vehicle controller is capable of performing both roll and pitch. In a further embodiment, inducing a reversible rotation of second flight component 712 of plurality of flight components 704 asserts an angular rotation about a perpendicular axis, such that the angular rotation will cause the aircraft to not flip over. Persons skilled in the art, upon reviewing the entirety of this disclosure, will be aware of various methods, means, and/or processes that may be used to command the second flight component to perform the autorotation inducement action, as used and described in the entirety of this disclosure.

Continuing to refer to FIG. 11, method 1100 may further include receiving, by vehicle controller 724, the failure datum associated with third flight component 716 of plurality of flight components 704. Receiving the failure datum associated with third flight component 716 from sensor 728 may include without limitation any receiving as described in further detail above in reference to FIGS. 1-8. Method 1100 may further include initiating, by vehicle controller 724, automatic response 732 as a function of the failure datum. Automatic response may include without limitation, any automatic response as described above in further detail in reference to FIGS. 1-8. Automatic response 732, as a non-limiting example, may be designed to allow the aircraft to land safely. Further, automatic response 732, as an example and without limitation, may be designed to flatten the descent spiral of the aircraft. Persons skilled in the art, upon reviewing the entirety of this disclosure, will be aware of various data, corrective measures, and/or protective measures that may be used as automatic response, as used and described in the entirety of this disclosure.

With continued reference to FIG. 11, initiating automatic response 732 further comprises determining an autorotation inducement action for the fourth flight component 720 to perform and commanding fourth flight component 720 of plurality of fight components 704 to perform the autorotation inducement action. Autorotation inducement action may include any autorotation act as described above in further detail in the entirety of this disclosure. In an embodiment and without limitation, autorotation inducement action may include shutdown of fourth flight component 720. Shutdown may include without limitation, any shutdown as described in above in further detail in reference to FIGS. 1-8. For example and without limitation, shutdown of fourth flight component 720 of plurality of flight components 704 can include eliminating the connection of power to the rotor opposite and diagonal the flight component associated to the failure datum, such that the rotor can freely rotate. Shutdown of fourth flight component 720 of plurality of flight components 704 may further include shutdown of third flight component 716 of plurality of flight components 704, such that there is no power received by third flight component 716 and fourth flight component 720. Autorotation may include without limitation, any autorotation act as described above in further detail in reference to FIGS. 1-8. In an embodiment, initiating the autorotation inducement action of fourth flight component 720 of plurality of flight component 704 includes reintroducing power to fourth flight component 720 of plurality of flight component 704, wherein fourth flight component 720 is supplied with the power to operate. For example and without limitation, commanding fourth flight component 720 of plurality of fight components 704 to perform the autorotation inducement action includes reconnecting power to a rotor opposite and diagonal the rotor associated with the failure datum, such that reconnecting power to the rotor will initiate prioritization of heave over yaw.

Still referring to FIG. 11, commanding fourth flight component 720 of plurality of fight components 704 to perform the autorotation inducement action may include inducing a reversible rotation of fourth flight component 720 of plurality of flight component 704. Reversible rotation may include without limitation, any revere rotation as described in further detail above in reference to FIGS. 1-8. In an embodiment, the reversible rotation of fourth flight component 720 includes fourth flight component 720 rotating in a direction opposite the direction of rotation of first flight component 708 and/or second flight component 712. For example and without limitation, first flight component 708 and/or second flight component 712 is rotating in a clockwise direction at 420 RPM and the induction of the reversible rotation of fourth flight component 720 of plurality of flight components 704 induces rotation in the counter-clockwise direction at 420 RPM. In a further non-limiting example, fourth flight component 720 of plurality of flight components 704 is initially rotating in a counter-clockwise direction as power is introduced to the aircraft, inducing a reversible rotation is fourth flight component 720 of plurality of flight component 704 rotating in a clockwise direction. In an embodiment, the reversible rotation will not be induced for fourth flight component 720 of plurality of flight components 704 unless the aircraft and/or vehicle controller is capable of performing both roll and pitch. In a further embodiment, inducing a reversible rotation of fourth flight component 720 of plurality of flight components 704 asserts an angular rotation about a perpendicular axis, such that the angular rotation will cause the aircraft to not flip over. Persons skilled in the art, upon reviewing the entirety of this disclosure, will be aware of various methods, means, and/or processes that may be used to commanding the fourth flight component to perform the autorotation inducement action, as used and described in the entirety of this disclosure.

In an embodiment, vehicle controller 724 when initiating automatic response 732 is configured to include a unified control law, wherein the unified control law only allows for the autorotation inducement action when adequate roll-pitch plane control of electrically powered aircraft 500 cannot be achieved. The unified control law is achieved by the prioritization of pitch over roll, over heave, over yaw. For example and without limitation, vehicle controller 724 is configured to not initiate automatic response 732 unless electrically powered aircraft 500 is capable of performing roll and pitch. Further, in the embodiment, automatic response 732 initiated by vehicle controller 724 can be configured to utilize the autorotation inducement action to control roll and pitch, wherein the control of roll and pitch is performed by utilizing the inertia in the autorotation inducement action relative to the torque available from the rotors to adjust attitude. For example and without limitation, the automatic response 732 can include controlling roll and pitch to reach a set desired landing site present in the flight management system. Further, in a non-limiting example, the automatic response 732 can include controlling roll and pitch to generate options for a feasible landing site from the flight management system, wherein the flight management system can include a database, combination of databases, server, computing device and/or combination of computing devices.

Further, in an embodiment, initiating automatic response 732 may be further configured to include flight controller 724 initiating thrust of a fifth flight component 736 of plurality of flight components 704. Fifth flight component 736 may include any fifth flight component 736 as described above in further detail in reference to FIGS. 1-11C. For example and without limitation, fifth flight component 736 of plurality of flight components may include a pusher propeller mechanically coupled to the tail of aircraft 500. Initiating thrust of fifth flight component 736, in an embodiment, is configured to impart yaw torque to the aircraft, as described in further detail in the entirety of this disclosure. Initiating thrust of fifth flight component 736 may be performed manually by the pilot, or automatically by vehicle controller 724. Persons skilled in the art, upon reviewing the entirety of this disclosure, will be aware of various methods, means, and/or processes that may be used to initiate thrust of fifth flight component 736, as used and described in the entirety of this disclosure.

Figure 12:
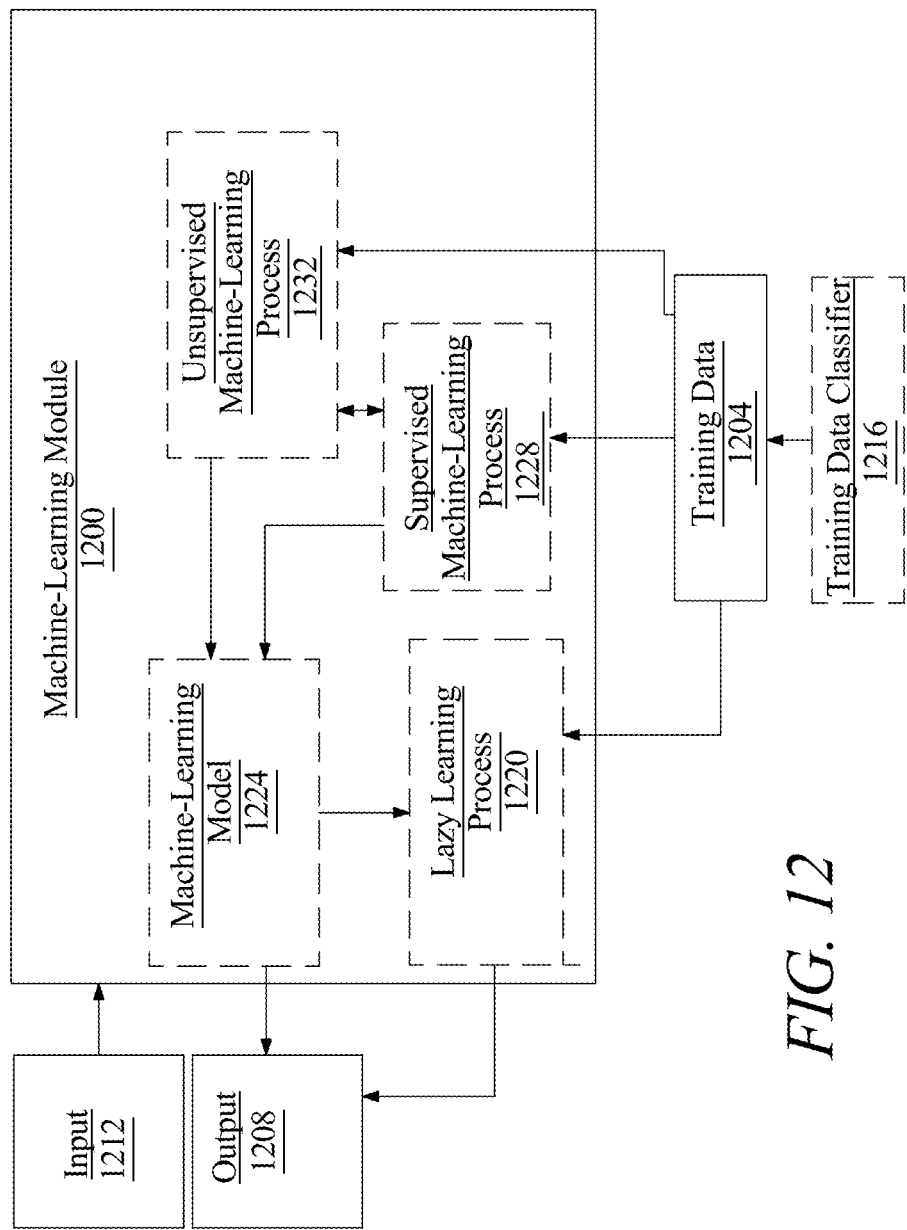
FIG. 12 is a block diagram illustrating an exemplary embodiment of a machine learning module.

Referring now to FIG. 12, an exemplary embodiment of a machine-learning module 1200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1204 to generate an algorithm that will be performed by a computing device/module to produce outputs 1208 given data provided as inputs 1212; this is in contrast to a non-machine learning software program where the commands to be executed are determined in advance by a user and written in a programming language.

Still referring to FIG. 12, "training data," as used herein, is data containing correlations that a machine-learning process may use to model relationships between two or more categories of data elements. For instance, and without limitation, training data 1204 may include a plurality of data entries, each entry representing a set of data elements that were recorded, received, and/or generated together; data elements may be correlated by shared existence in a given data entry, by proximity in a given data entry, or the like. Multiple data entries in training data 1204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1204 according to various correlations; correlations may indicate causative and/or predictive links between categories of data elements, which may be modeled as relationships such as mathematical relationships by machine-learning processes as described in further detail below. Training data 1204 may be formatted and/or organized by categories of data elements, for instance by associating data elements with one or more descriptors corresponding to categories of data elements. As a non-limiting example, training data 1204 may include data entered in standardized forms by persons or processes, such that entry of a given data element in a given field in a form may be mapped to one or more descriptors of categories. Elements in training data 1204 may be linked to descriptors of categories by tags, tokens, or other data elements; for instance, and without limitation, training data 1204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 12, training data 1204 may include one or more elements that are not categorized; that is, training data 1204 may not be formatted or contain descriptors for some elements of data. Machine-learning algorithms and/or other processes may sort training data 1204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1204 to be made applicable for two or more distinct machine-learning algorithms as described in further detail below. Training data 1204 used by machine-learning module 1200 may correlate any input data as described in this disclosure to any output data as described in this disclosure. As a non-limiting illustrative example flight elements and/or pilot signals may be inputs, wherein an output may be an autonomous function.

Further referring to FIG. 12, training data may be filtered, sorted, and/or selected using one or more supervised and/or unsupervised machine-learning processes and/or models as described in further detail below; such models may include without limitation a training data classifier 1216. Training data classifier 1216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1200 may generate a classifier using a classification algorithm, defined as a processes whereby a computing device and/or any module and/or component operating thereon derives a classifier from training data 1204. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 12, machine-learning module 1200 may be configured to perform a lazy-learning process 1220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1204. Heuristic may include selecting some number of highest-ranking associations and/or training data 1204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 12, machine-learning processes as described in this disclosure may be used to generate machine-learning models 1224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1224 may be generated by creating an artificial neural network, such as a convolutional neural network comprising an input layer of nodes, one or more intermediate layers, and an output layer of nodes. Connections between nodes may be created via the process of "training" the network, in which elements from a training data 1204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 12, machine-learning algorithms may include at least a supervised machine-learning process

1228. At least a supervised machine-learning process 1228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1204. Persons skilled in the art, upon reviewing the entirety of this disclosure, will be aware of various possible variations of at least a supervised machine-learning process 1228 that may be used to determine relation between inputs and outputs. Supervised machine-learning processes may include classification algorithms as defined above.

Further referring to FIG. 12, machine learning processes may include at least an unsupervised machine-learning processes 1232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 12, machine-learning module 1200 may be designed and configured to create a machine-learning model 1224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 12, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
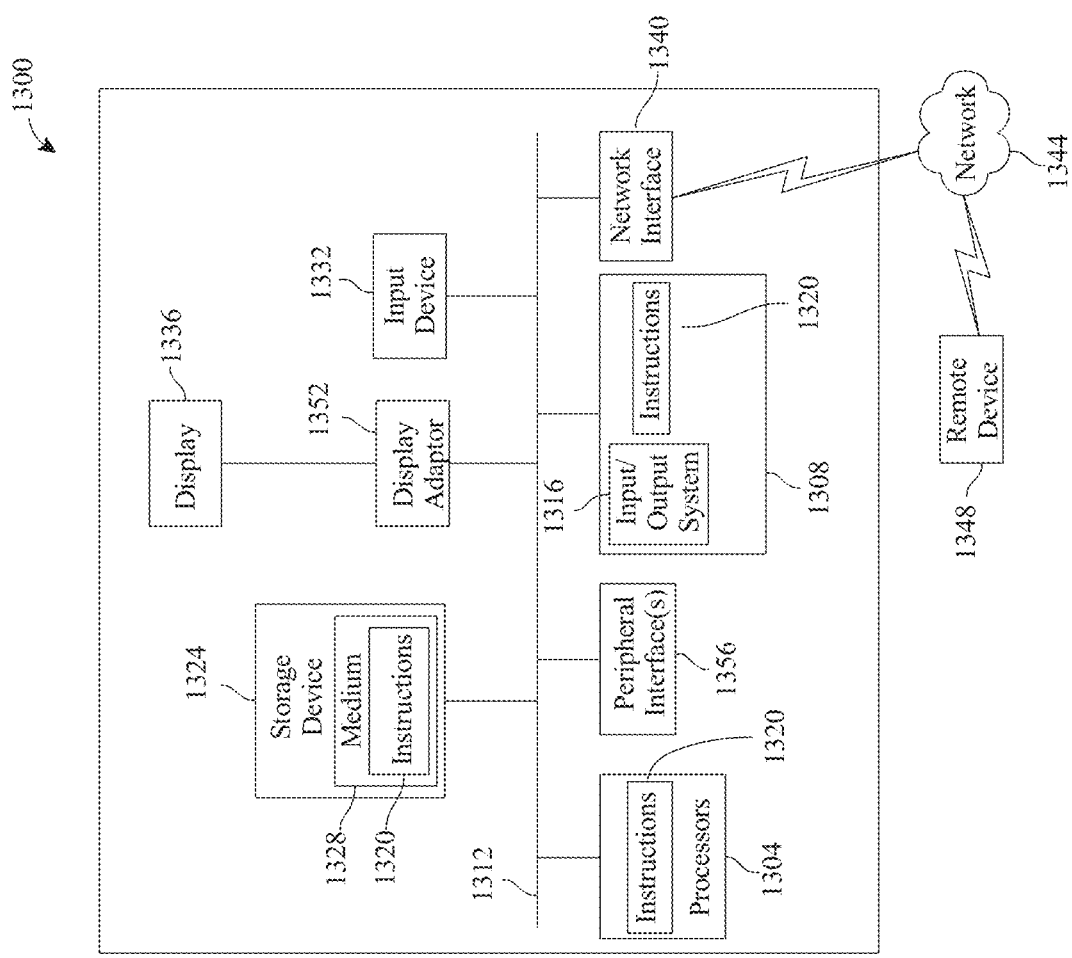
FIG. 13 is a block diagram of a computing system that can be used to implement any one or more of the methodologies disclosed herein and any one or more portions thereof.

Referring now to FIG. 13, shown is a diagrammatic representation of one embodiment of a computing device in the exemplary form of a computer system 1300 within which a set of instructions for causing a control system, such as the in-flight stabilization system 100 of FIG. 1 and/or in-flight stabilization system 700 of FIG. 7, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 124) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 794 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for in-flight stabilization, the system comprising:
    a plurality of propulsors mechanically coupled to an aircraft, wherein the plurality of propulsors includes a first propulsor, a second propulsor opposing the first propulsor, and a propeller configured to rotate to induce a thrust of the aircraft;
    a sensor mechanically coupled to the aircraft, wherein the sensor is configured to:
        detect a failure event associated with the first propulsor; and
        generate a failure datum based on the failure event; and
    a vehicle controller communicatively connected to the sensor, wherein the vehicle controller is configured to:
        receive, from the sensor, the failure datum associated with the first propulsor;
        generate, at the vehicle controller, a failure notification, the failure notification:
        indicating that the failure event is associated with the first propulsor; and
        initiate an automatic response based on the failure datum, the automatic response including:
            determining an autorotation inducement action for the second propulsor to perform, the autorotation inducement action eliminating power to the second propulsor at a first time and reconnecting power to the second propulsor at a second time;
            cause the second propulsor to operate based on the autorotation inducement action; and
            initiating rotation of the propeller to induce the thrust of the aircraft.

2. The system of claim 1, wherein the aircraft further comprises an electric aircraft.

3. The system of claim 1, wherein the vehicle controller is further communicatively coupled to the plurality of propulsors.

4. The system of claim 1, wherein determining the autorotation inducement action for the second propulsor further comprises shutting off the second propulsor.

5. The system of claim 1, wherein determining the autorotation inducement action for the second propulsor further comprises:
    inducing a reversible rotation, the reversible rotation causing the second propulsor to rotate in a direction opposite to a powered direction.

6. The system of claim 1, wherein the sensor is further configured to:
    detect a failure event of a third propulsor of the plurality of propulsors; and
    generate a failure datum associated with the third propulsor.

7. The system of claim 6, wherein the vehicle controller is further configured to:
    receive the failure datum associated with the third propulsor; and
    initiate the automatic response based on the failure datum, the automatic response including:
        determining a second autorotation inducement action for a fourth propulsor of the plurality of propulsors to perform, wherein the fourth propulsor opposes the third propulsor; and
        cause the fourth propulsor to operate based on the second autorotation inducement action.

8. The system of claim 7, wherein determining the autorotation inducement action for the fourth propulsor further comprises: inducing a reversible rotation for the fourth propulsor.

9. The system of claim 1, wherein:
    the second propulsor opposes the first propulsor on a diagonal axis of the aircraft, and
    the diagonal axis is at a first angle relative to a lateral axis of a wing of the aircraft.

10. The system of claim 1, wherein:
    the first time and the second time are determined to prioritize heave over yaw during a controlled descent of the aircraft.

11. A method in-flight stabilization, the method comprising:
    detecting, by a sensor, a failure event associated with a first propulsor of a plurality of propulsors of an aircraft, wherein the plurality of propulsors includes a first propulsor, a second propulsor opposing the first propulsor, and a propeller configured to rotate to induce a thrust of the aircraft;
    generating, by the sensor, a failure datum based on the failure event;
    receiving, by a vehicle controller, the failure datum associated with the first propulsor from the sensor;
    generating, by the vehicle controller, a failure notification, the failure notification indicating that the failure event is associated with the first propulsor; and
    initiating, by the vehicle controller, an automatic response based on the failure datum, wherein the automatic response comprises:
        determining an autorotation inducement action for the second propulsor to perform, the autorotation inducement action eliminating power to the second propulsor at a first time and reconnecting power to the second propulsor at a second time;

causing the second propulsor to operate based on the autorotation inducement action; and initiating rotation of the propeller to induce thrust of the aircraft.

12. The method of claim 11, wherein the aircraft further comprises an electric aircraft.

13. The method of claim 11, wherein the vehicle controller is communicatively coupled to the plurality of propulsors.

14. The method of claim 11, wherein determining the autorotation inducement action for the second propulsor further comprises shutting off the second propulsor.

15. The method of claim 11, wherein determining the autorotation inducement action for the second propulsor further comprises:

inducing a reversible rotation, the reversible rotation causing the second propulsor to rotate in a direction opposite to a powered direction.

16. The method of claim 11, the method further comprising:

detecting, by the sensor, a failure event of a third propulsor of the plurality of propulsors; and generating, by the sensor, a failure datum associated with the third propulsor.

17. The method of claim 16, the method further comprising:

receiving, by the vehicle controller, the failure datum associated with the third propulsor; and initiating, by the vehicle controller, the automatic response based on the failure datum, the automatic response including:

determining a second autorotation inducement action for a fourth propulsor of the plurality of propulsors to perform, wherein the fourth propulsor opposes the third propulsor; and cause the fourth propulsor to operate based on the second autorotation inducement action.

18. The method of claim 17, wherein determining the autorotation inducement action for the fourth propulsor further comprises:

inducing a reversible rotation for the fourth propulsor.

* * * * *